Oct. 16, 1956 H. B. CANNON ET AL 2,766,882
METHOD AND APPARATUS FOR SEPARATING AND
CONCENTRATING GRANULAR MIXTURES
Filed July 9, 1952                                     7 Sheets-Sheet 1
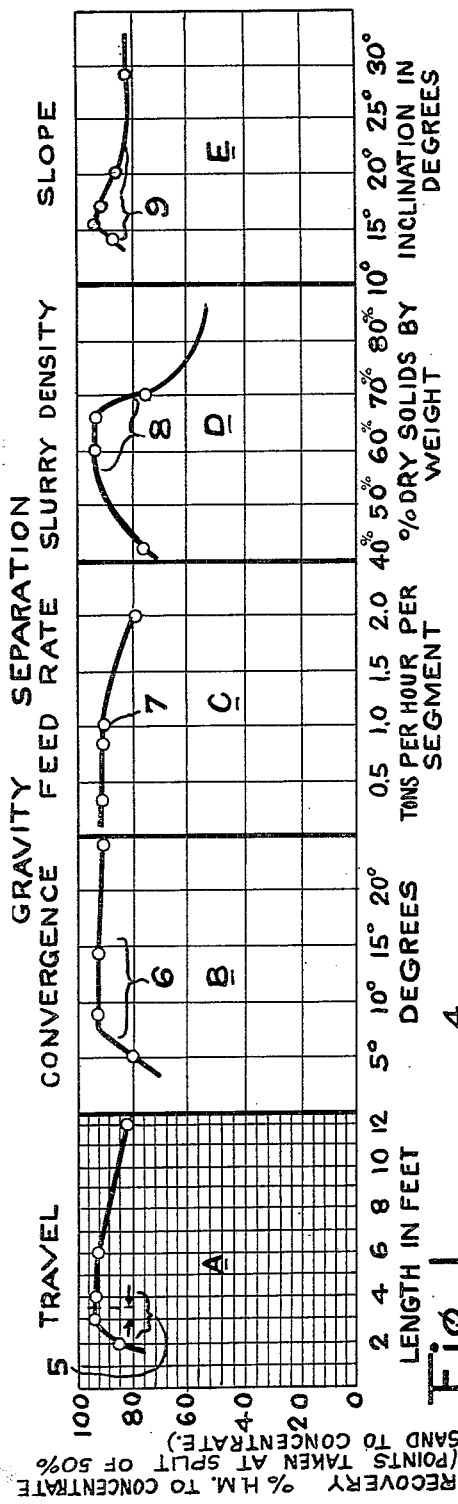
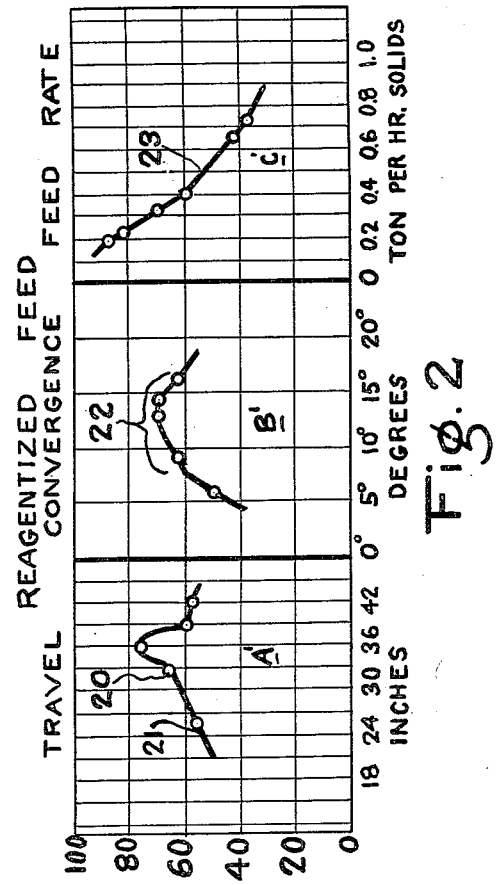
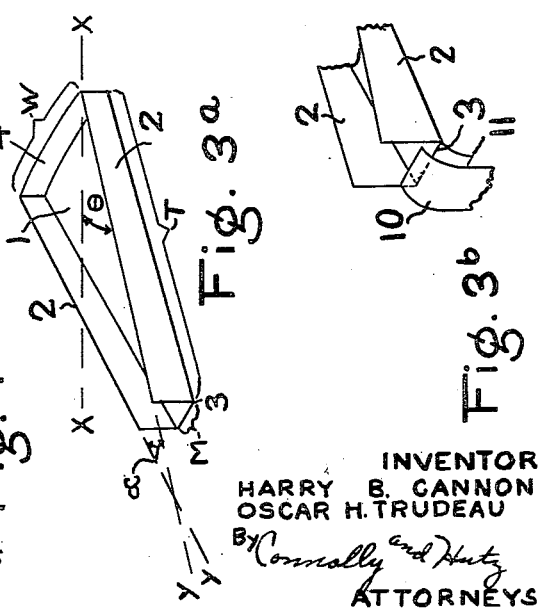
INVENTORS
HARRY B. CANNON
OSCAR H. TRUDEAU
By Connolly and Hutz
ATTORNEYS

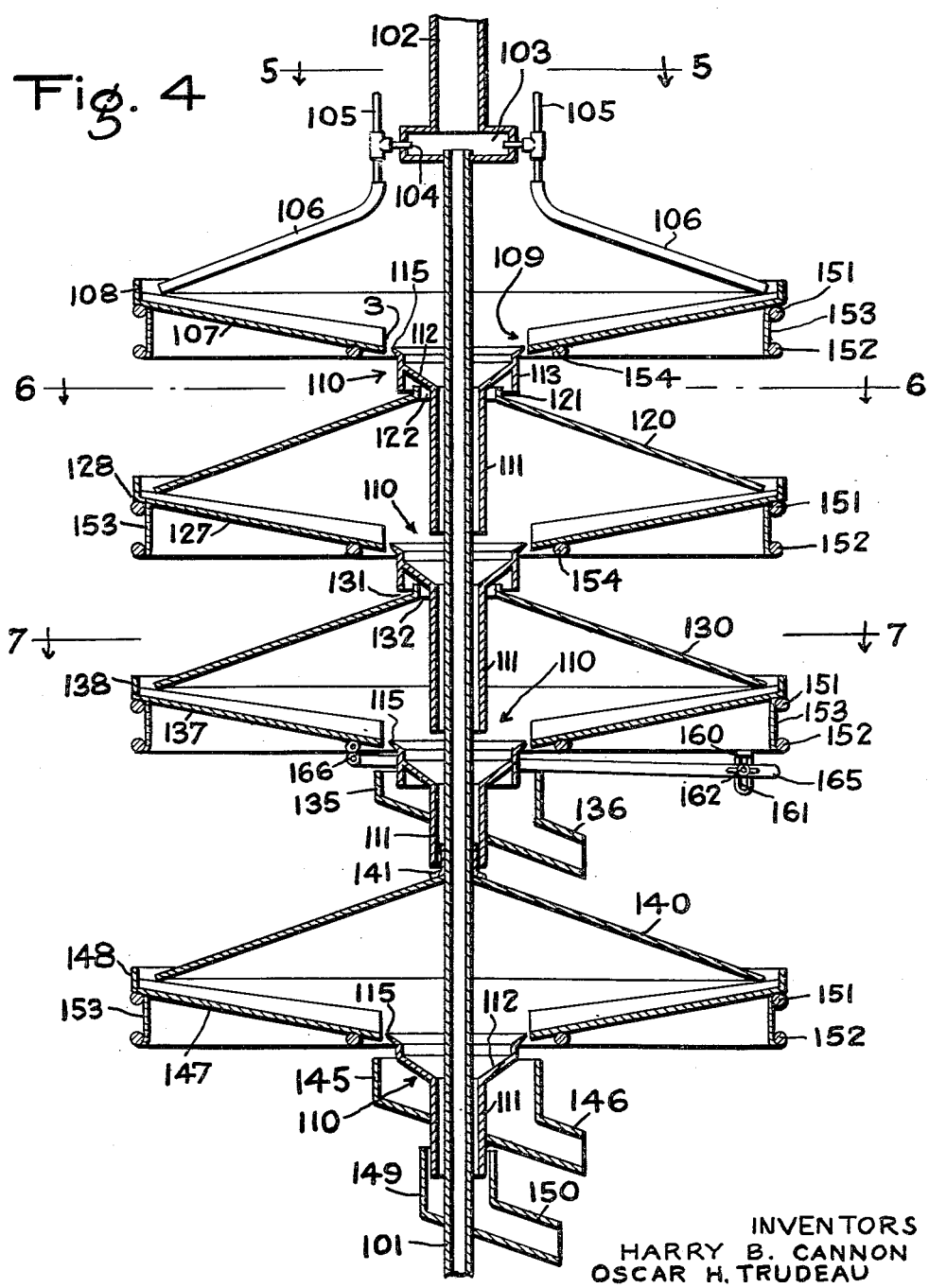

Oct. 16, 1956    H. B. CANNON ET AL    2,766,882
METHOD AND APPARATUS FOR SEPARATING AND
CONCENTRATING GRANULAR MIXTURES
Filed July 9, 1952                    7 Sheets-Sheet 4

INVENTORS
HARRY B. CANNON
OSCAR H. TRUDEAU
BY
Connolly and Hutz
ATTORNEYS

INVENTORS
HARRY B. CANNON
OSCAR H. TRUDEAU
BY Connolly and Hutz
ATTORNEYS

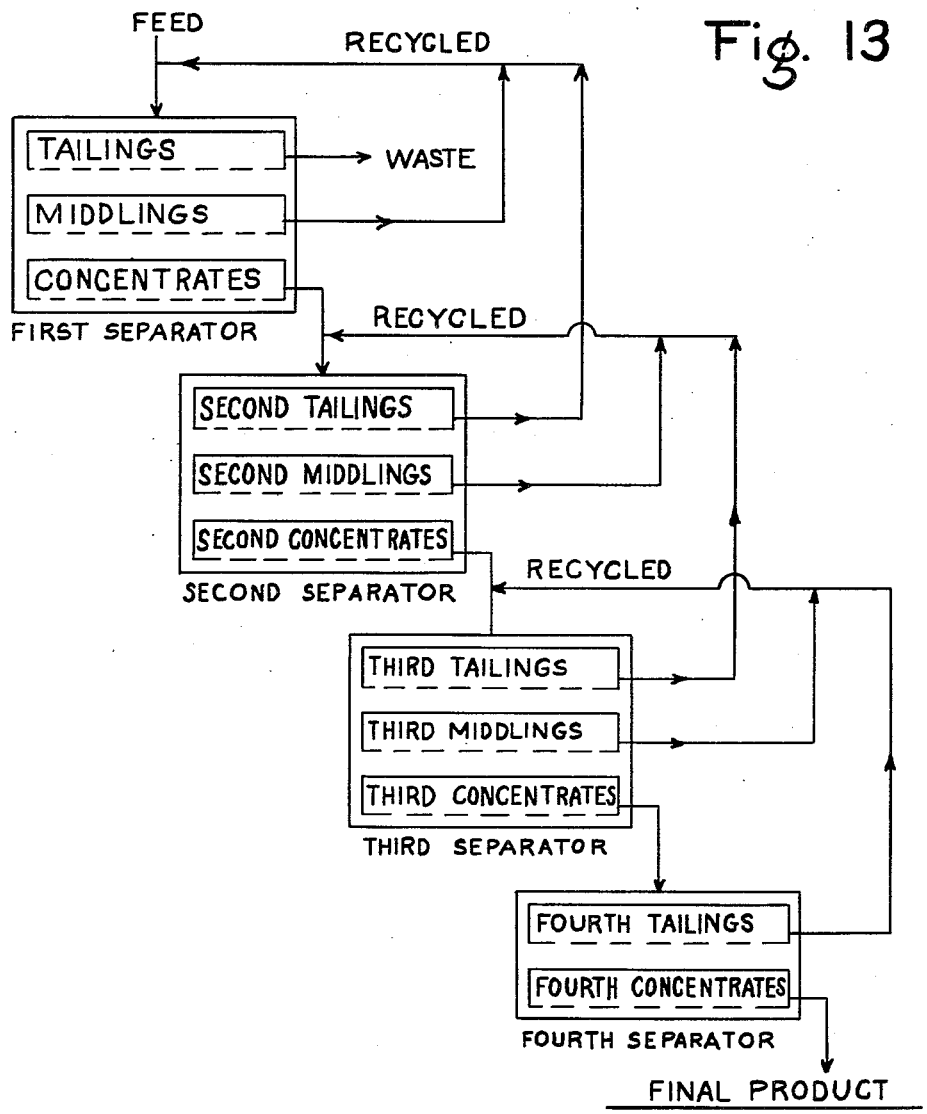

United States Patent Office 2,766,882
Patented Oct. 16, 1956

2,766,882

METHOD AND APPARATUS FOR SEPARATING AND CONCENTRATING GRANULAR MIXTURES

Harry Beard Cannon, Lakeland, and Oscar H. Trudeau, Starke, Fla.; said Trudeau assignor to said Cannon Application July 9, 1952, Serial No. 297,952

27 Claims. (Cl. 209—157)

This invention relates to a method and apparatus for separating a granular mixture into its constituent components by a gravity induced stratification thereof. More particularly the invention is concerned with the separation of ores, either dry or in aqueous slurries, into several separated portions or strata, one of which contains the major portion of the valuable mineral, while another contains so little that it may be economically discarded.

It is frequently desirable, if not essential, to concentrate the ore at the mine face and to discard the bulk of uneconomic material nearby, before transporting the concentrated minerals to a location where the desired constituents can be recovered and refined. In many mining operations the ores are of such low grade that an economic recovery of desired constituents would otherwise not be possible.

A classic example of such an operation is the placer mining of gold and tin by means of dredges. It is essential therein that the great bulk of the worthless quartz sands be separated from their valuable mineral contents at the dredging site, thus greatly reducing the amount of material to be transported and subjected to subsequent processing. For this purpose various types of shaking tables, stationary tables, jigs, troughs, sluices and the like have been suggested. One of the most successful in recent years is the so-called "Humphrey's Spiral." This consists of a vertical chute in the form of a helix in which separation is performed by stratification and inertia displacement of the material during its travel down the chute, the various fractions being drawn off through separate openings placed along the path of travel at spaced intervals. This equipment is, however, quite bulky, heavy and expensive.

Other types of separators have taken various shapes and forms, some have been of the gravity-feed, pinched sluice-type such as that disclosed in U. S. Letters Patent 650,138, or of the closed conduit type such as that disclosed in U. S. Letters Patent 2,171,674. The former type has long been abandoned in commercial use because of its extreme bulkiness and inefficiency (the length being 16 feet with a feed end width of 2 feet); while the latter type has several distinct disadvantages in that it does not permit a true "gravity-stratified" separation because of the positive pressure head maintained at the feed end and is also bulky and cumbersome (having a length of 8 feet and a feed end width of almost 3 feet). But the constructional features of either type unit are much simpler than those of the "Humphrey's Spiral" and at first glance would seem to warrant a commercial priority thereof, particularly the pinched-sluice type.

There has been little if any acceptance of this latter type separator, however, due to the fact that the prior art constructions have all produced an exceedingly low percentage recovery (i. e., the percent recovered valuable mineral compared to the percent valuable mineral in the mineral head feed) which has relegated this type unit to a position of neglect.

This inefficacy of the pinched sluice-type separator has been due to a failure by those in the art to recognize certain critical limitations which control the efficiency of this type unit. In particular, the major error committed in prior sluice-type separators has been an attempt to increase capacity by increasing size at the expense of the recovery and grade of the recovered minerals, and the portability of the unit. The conditions of a high capacity per hour per unit and a high percentage recovery of an acceptable grade are to a certain degree incompatible, but a compromise solution producing a maximum overall efficiency may be reached by the method and structure of the instant invention.

It is, therefore, a prime object of this invention to provide an ore separating and concentrating unit which has a high efficiency in both percentage recovery and capacity per hour, while maintaining a good grade in the recovered concentrate. It is a further object of this invention to produce an ore separating unit which is small in size and inexpensive to construct. A still further object is to provide a method of separating valuable minerals from their constituent natural waste materials in an inexpensive and speedy process while minimizing excessive ore dressing operations such as fine-mesh pre-grinding. Additional objects and advantages will become apparent as the description of this invention proceeds.

The methods and apparatus are applicable to any well divided ore that may be caused to flow as such or suspended in a liquid over the inclined converging trough. The invention is particularly applicable to heavy mineral bearing sands found in nature, such as sands containing ilmenite, rutile, zircon, cassiterite or like minerals. Gravity separation or stratification of a mixture of dry granules may be obtained in this manner subsequently specified due to differences in specific gravity and grain size without the necessity of a fluid carrier. Dry separations may be applied to any form of granular mixtures such as ores, seeds, etc.

The invention may also be applied to "heavy-media" separations, wherein ores containing granular constituents of diverse specific gravities are mixed in an aqueous slurry containing finely ground high-density material such as magnetite or ferrosilicon. These dense fine particles increase the specific gravity of the slurry to a selected point whereat the gangue elements of the ore are floated and the heavier, and generally valuable granules sink.

In the case of "gravity separation" which is particularly effective for separating the heavy mineral-bearing sands, it is preferable to use an aqueous slurry containing a high percentage of the natural ore, for example, one having a dry solid content of between 55 and 72 percent. In the case of the lighter valuable minerals which have little gravity differential from their gangue constituents, it may be desirable to treat the feed with flotation reagents in order to influence stratification of the various solid constituents thereof. The former type of separation is commonly referred to as "gravity separation," while the latter type separation is commonly referred to as "reagentized feed separation." In the former case the lower portion of the slurry mixture usually constitutes the valuable concentrate, while in the latter, the upper floating portion or strata of the slurry usually contains the valuable mineral concentrate.

Broadly speaking, this invention involves the use of an inclined trough or sluice having converging sides and a relatively narrow outlet, over which the ore, preferably in the form of an aqueous slurry, flows and in which it becomes stratified. Combined therewith are means located in a zone of free fall beyond said outlet, whereby the effluent or "fan" is divided into several portions containing widely varying concentrations of the desired minerals.

By keeping the angle at the apex small it is possible to retain a smooth slurry flow along the entire length of the sluice which greatly assists and preserves the proper stratification action. In prior art construction, the apex angle has always been relatively large and resulted in high turbulence of the slurry as it neared the apex, destroying the stratification. This resulted in poor efficiency. The instant construction, however, avoids this difficulty completely by confinement to a narrow angle of convergence.

One characteristic and distinguishing feature of this invention is the development of a sluice-type separator and concentrator which has a hitherto unknown and uncontemplated smallness and compactness which readily permits the convenient grouping of a plurality of such separators into a circular cone arrangement with maximum capacity and maximum efficiency assured in a relatively small space; the capacity being in the order of twenty to one hundred times a standard Wilfley or Deister table of the same aerial extent.

Another characteristic and distinguishing feature of this invention is the provision of dividing means located beyond the outlet of the trough, whereby the effluent is separated into several portions in a zone of free fall. We have found that the stratification into layers of varying composition which takes place during passage through the trough is retained in the effluent fan formed beyond the outlet, and that the separation into portions of widely varying compositions can most effectively take place there. Any attempt to introduce the dividing means through the outlet above the floor of the trough and before the fluid enters the "free fall" zone results in flow stoppage, sand-berring and turbulence, with a consequent loss of efficiency or even complete failure of the separation.

The dividing means employed according to this invention is preferably formed by the edge of a metal sheet or the like, that is disposed in a plane of stratification at right angles to the direction of flow. Preferably this "splitter" is adjustable at right angles normal to the planes of stratification, in order to permit selectivity and adjustment to changing ore and separating conditions. In many cases, we employ two such splitters, thus dividing the effluent fan or lamellar jet which issues from the trough into three distinct portions. For the sake of convenience the portion containing most of the desired minerals will be termed the "concentrate." The intermediate portion that is usually reprocessed will be termed the "middlings," while the portion having the lowest mineral values, that is usually discarded, will be called the "tailings." Obviously, it is possible within the scope of our invention to employ but a single splitter or more than two, depending upon the number of distinct fractions desired. The dual splitter construction may be used in either type of separation and is particularly advantageous for multistage countercurrent recirculation of low grade ores.

Still another feature relates to a novel process for separating and concentrating phosphates, potash, feldspars and like light minerals and a similar process for separating and concentrating gold, silver, ilmenite, zircon and other type heavy minerals from a mineral and gangue mixture occurring in the natural state.

In one embodiment of our invention a special rounded lip or guide plate is provided at the bottom edge of the narrow trough outlet, forming a downwardly curved extension of the trough bottom, whereby the effluent fan is spread due to surface attraction. The spreading of the fan and the further slowing up of the most dense fraction permits a more precise stratification and renders the subsequent splitting into distinct fractions even more effective.

In seeking the solution to obtaining a proper balance between maximum recovery of values and maximum capacity while retaining a good quality in the grade of the finished concentrate, it has been discovered that many variable factors including both constructional features and operational features control the final result; and further, that these features vary with the type of separation, i. e., "gravity," "reagentized feed" and "heavy media separation."

Among the constructional features which have been found to be critical are the length of slurry travel over which the stratified suspension flows; the angle of convergence of the sluice walls; the width of the discharge end of the individual sluice segment; the distance in a zone of free fall, in which the liquid slurry is discharged from the trough in a field of gravity, where the slurry flow is separated into its constituent portions; and the angle of slope of the separating segments.

Among the operational features controlling the final result are the depth of the slurry; the slope of the slurry flow; the density of the slurry (percent solids by weight); and the rate of head feed per hour.

The velocity of the slurry flow for each type of separation, either gravity or reagentized, and for the various types of ores separated has an optimum mean value. This value, however, is directly related to and influenced by the feed rate, the angle of convergence, the slope of the sluice trough and slurry density, and will vary accordingly; although in general, the mean velocity of the slurry should be such that adequate stratification is obtained while maintaining the uppermost strata velocity as low as possible without reducing the bottom strata velocity to zero. Maintenance of this condition will assure minimum turbulence for efficient separation.

Examination of the various characteristics of the instant type separator under a multitude of operating conditions has established several hitherto unsuspected conditions of operation. Among these, are the facts that the maximum capacity for gravity separations is determined by the depth of the effluent stream; that the width of the feed end of the sluice has little apparent or controlling effect on the effective and efficient capacity of the unit; and that the grade of head feed ore is not critical; although it does influence certain optimum operating conditions.

Extensive tests have indicated that the feed end width of the sluice may be varied within certain limits without influencing the capacity of the individual segment. This factor is particularly advantageous when contemplating, as herein, the construction of a small separating apparatus which can handle a large capacity per hour in a small space.

It has been further established that for most types of separation some kind of retarding structure must be provided along the path of slurry travel to reduce the velocity of the fluid in a systematic manner, although it is possible to separate readily flowable solids without such drag structure. Economic considerations render it feasible that this drag inducing factor be provided through the medium of side walls, limiting the slurry velocity in a gradually restricting manner in order to systematically slow the fluid flow and permit stratification of the mineral suspensions. The pinch type sluice is a simple solution to this problem whereby a relatively wide sluice feed end is provided, having an arbitrary unit volume capacity, but having an increased surface area in contact with the same unit volume of water, thereby providing greater resistance to flow and increasing the settlement and stratification of the concentrate portions. The configuration of the pinch sluice type separator readily provides a gradual and systematic increase in contact area for producing the required "drag" effect; however, the rate of convergence limits the feed rate and therefore capacity of the unit, in that too sharp an angle of convergence creates turbulence rendering separation ineffective.

A further limiting factor in the construction of the unit is the slope of the bottom of the sluice. This angle of slope is critical and is inherently related to the density of the head feed slurry and its proportion of content of high density values. In gravity type separations the degree of slope controls the rate of stratification or settlement of the valuable minerals, while in reagentized separation it controls the stratification of the waste sand particles. In this latter type separation a steep slope will increase "turbulence" to a point where separating action is ineffective.

To facilitate a full comprehension of this invention and to illustrate how it may be carried out in practice, reference will now be made to the accompanying drawings in which:

Figs. 1 and 2 are graphs, respectively indicating variations in the percentage recovery rate for gravity-type separations and reagentized feed-type separations with respect to constructional and operational variations.

Fig. 3a is a schematic view of the pinched-sluice segment of separator of the instant invention.

Fig. 3b is a fragmentary schematic view of a modified sluice and an associated fluid splitter element.

Fig. 4 is a schematic sectional view of a separating apparatus for "reagentized feed" separations including multiple pinched-sluice units arranged in vertically staggered batteries of inverted frusto-conical configuration.

Fig. 13 is a schematic illustration of a flow sheet depicting a multi-stage countercurrent recirculation process for "gravity type" separations.

Figure 5:
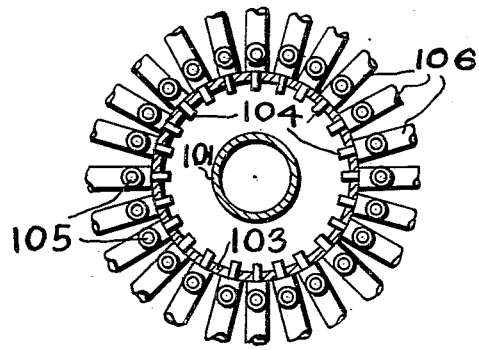
Fig. 5 is a sectional view along the line 5—5 of Fig. 4.

Reference will now be made to the drawings, particularly Figs. 1, 2, 3a and 3b thereof, to more fully and adequately set forth the basic theories and limiting considerations involved in the instant invention. Fig. 3a is a diagrammatic view of a single pinched-sluice type separator constructed according to the instant invention. As shown in the figure, the sluice consists of a trough having a triangularly shaped bottom surface 1 (the length of which is denoted by the bracket T for the purpose hereinafter set forth) which is inclined at an angle (e) with respect to the horizon (indicated by dashed line X—X). Raising from the floor 1 are integral, converging and vertically extending side walls 2 which converge from the relatively wide feed end 4 of the trough to the respectively narrow discharge end 3 at the included angle indicated as α between the dashed line Y—Y extended from the side walls 2. The widths of the feed and discharge ends have been respectively denoted as (w) and (m) for the purpose hereinafter apparent.

Adjacent the discharge end 3 of the trough there is provided a mechanical splitter in the form of a thin sheet (see 10 in Fig. 3b) which is positioned beyond the end of the trough in a zone of "free fall" wherein fluid conveyed over the surface of the inclined trough will be discharged at the nose 3 into a field of gravity. If desired, an outwardly curved depending lip portion (see 11 in Fig. 3b) may be provided at the discharge end 3 to assist in forming a more effective lamellar jet in the effluent fan of the discharge fluid flow.

As will be clear from an inspection of Fig. 3a, the walls 2 converge gradually towards the apex of the triangular configuration while simultaneously increasing the effective vertical extending surface of such walls. This gradual and systematic increase in the effective side walls slurry contacting surfaces, while converging the fluid flow into a narrower path, provides the requisite progressively increasing drag on the fluid stream necessary to an operative separating action. The depending lip portion 11 of Fig. 3b may be dispensed with, as in the instant case, although it has been found to be effective in increasing the vertical span of the lamellar jet formed in the fluid stream in the "free fall" zone. This latter action is attributable to the surface adhesion between the lower strata of water and the adjacent floor 1 of the trough.

Reference will now be had to Figs. 1 and 2 along with Figs. 3a and 3b in describing the critical limitations on constructional and operational features found necessary to an efficient result with such type separator. In Fig. 1 there are shown five separate graphs indicating the variation in the percertange recovery with respect to variations in the length of slurry travel, the convergence angle between the side walls, the head feed rate, the slurry density, and the slope or inclination of the sluice floor for "gravity-type" separations of heavy minerals. Fig. 2 graphically illustrates variations in the percentage recovery with respect to variations in slurry travel, the convergence angle, and the head feed rate for "reagentized feed-type" separations.

In Fig. 1 the separate curves are respectively indicated as A through E inclusive. Curve A illustrates the variation in the percentage recovery with respect to changes in the length of travel of the slurry flow for gravity-type separations, and shows that for travel lengths below two feet (24 inches) the recovery rate is considerably below 85 percent but sharply rises as the length of slurry travel is increased to a maximum of approximately 95 percent in a region of slurry length of travel approximating three feet (36 inches), where it begins to gradually decrease for increasing slurry lengths up to approximately six feet (72 inches) before more sharply decreasing. It will be apparent that maximum efficiency of the separator can be assured by selecting lengths in the region between approximately 36 inches and 48 inches. Lengths beyond this limit, although having an effective high recovery rate, are not practical since they take up additional space without providing any additional benefit or increase in efficiency. In extensive tests it has been found that the percentage recovery may be maintained at a very desirable high value, approximating 95 percent, while varying the length of slurry travel for gravity-type separations between 36 inches and 42 inches. This latter range, indicated by the bracket 5 on curve A, is preferred because it assures the maximum percentage recovery with relatively short travel lengths.

Curve B illustrates the variation in the percentage recovery with variations in the convergence angle α between the sides 2—2 (Fig. 3) of the pinched sluice. As shown, with a convergency angle in the neighborhood of six degrees and less, the percentage recovery is below 85 percent, but sharply rises to a maximum of approximately 95 percent with an increase in the convergency angle to approximately seven or eight degrees where the recovery remains constant. This clearly indicates that the convergence angle constitutes a lower critical limit, in the neighborhood of seven degrees, below which the percentage recovery rate is definitely adversely affected. Above this lower critical limit, variations in the convergency angle do not directly affect the percentage recovery, at least up to about sixteen degrees. Practical commercial considerations however limit this variation to the range, indicated by the bracket 6, between the limits of six and sixteen degrees, since wider angle convergences take up correspondingly more space without supplying any additional recovery benefit or capacity. Another more potent factor also controls the upper limit. Wider convergence angles produce a sharp increase in turbufence in the spillway and reduce the grade of the recovered mineral concentrate.

Curve C indicates the variation in the percentage recovery with respect to variations in the head feed rate (tons per hour) of the material to be processed. An inspection of the curve shows that the percentage recovery remains approximately constant for variations in the feed rate below one-half ton per hour up to a rate of one ton per hour at which point the curve begins to break and tail downwardly progressively. This breaking point of the curve is indicated at 7 in the figure and constitutes the limitation of maximum capacity per unit per hour in order to retain a high percentage recovery rate with a commercially acceptable grade of recovered mineral. However, under certain mining conditions, as for example in fields having an especially high content of valuable minerals per unit of ore, it may be desirable to extend this maximum capacity limit beyond the one one ton limit in order to produce maximum output with a minimum amount of equipment in a given amount of time. The grade, being particularly high to start with, will not be reduced below the acceptable limits for further processing up to about 1½ tons per hour.

Curve D illustrates the variation in the percentage recovery with respect to variations in the slurry density. As shown in the figure, the curve gradually rises from a low recovery rate of 76 percent with a slurry density of slightly over 40 percent (dry solids by weight) to a maximum percentage recovery approximating 95 percent with an increase in slurry density to 55 percent. From this point, the recovery remains constant up to slurry densities of slightly less than 70 percent where it drops off sharply. This sharp break in the curve is due to sand barring which occurs with slight variations for different minerals within the range between 65 percent and 72 percent in the slurry density, and manifests itself where the increase in the mineral particles for a given volume of slurry fluid begins to present problems of "particle interference" and piling up during travel down the spillway, with attendant increases in turbulence and eddy currents. This results in a reduction in the recovery and an unacceptable grade in the recovered mineral. The curve illustrated breaks in the region of a slurry density of about 67 percent, but it will be understood that the breaking point will occur at densities of 72 percent for some minerals. The effective range of variation for all type minerals is indicated by the bracket 8 to lie between 55 percent and 72 percent.

Curve E represents the variations in the percentage recovery rate with respect to the inclination of the trough floor from the horizontal. As indicated, the curve sharply rises with an inclination below 13 degrees from a recovery rate of approximately 90 percent to a rate of 95 percent with an increase in inclination to 15 degrees. The curve hits its peak at this point but slowly breaks thereafter at an inclination of 16 degrees, where it begins tailing downwardly to a lower recovery rate of approximately 85 percent with progressively greater inclinations. For the instant mineral process the maximum recovery rate is obtained with an inclination of between 15 to 16 degrees. However, some minerals exhibit maxims on either side of this narrow range, and when coupled with other considerations such as sand barring and particle interference, make it advisable to extend the range of variation to a lower limit of 13 degrees and upper limit of 23 degrees without substantially impairing an acceptable recovery rate.

This extension of permissible slope variation is made necessary by the newly discovered phenomena that the optimum slope angle also depends upon the relative proportion of dense or "high specific gravity" values per unit of head feed ore. The minerals processed in the tests of Fig. 1 were ores which contained only 3–5% of "dense" or "high specific gravity" values and when recycled or reprocessed in a "multi-stage countercurrent" separation process, to be described infra, wherein succeeding stages were fed proportionately greater concentrations of "dense" or "heavy specific gravity" values it was noted that the percentage recovery sharply fell off. Investigation showed that this drop in efficiency was due to the fact that each succeeding stage was processing proportionately thicker strata of "dense" or "heavy specific gravity" values which produced an incremental tendency towards sandbarring and resultant turbulence in succeeding stages. Of the two possible ways to correct this situation (i. e., by decreasing slurry density or increasing the flow slope) it was determined that a change in the flow slope was the only practical solution since a decrease in density would produce a portionate increase in slurry velocity and decrease the separating time while producing a state of slurry turbulence and reducing the recovery rates.

These tests have indicated that the permissible slope variations within the range indicated may be generally collated as follows: for low grade (low proportion of "dense" values—up to 25%) feeds θ should approximate 15°; for medium grade (medium proportion of "dense" values—25–50%) feeds θ should approximate 18°; and for high grade (high proportion of "dense" values—above 50%) feeds θ should approximate 21°. It will be understood that slight variations on either side of the indicated preferred limits are permissible.

Coupled with the above noted limitations, are the constructional limitations of the pinched-sluice-type separator with respect to feed end width ($w$) and the discharge nose width ($m$) (see Fig. 3a). An examination under various operation conditions has established that variations in the feed end width ($w$) of the order of 4 inches to 12 inches do not adversely effect the capacity of the unit and have no relationship to the percentage recovery rate. With feed end widths below four inches the ability of the unit to efficiently handle different type minerals having different specific particle and gangue sizes is adversely effected, while widths in excess of the twelve inch maximum require increased area and consequently larger units to compensate therefor, but increase neither the recovery rate nor capacity. In fact, increases beyond the above maximum adversely effect the recovery and the efficiency of the design in that larger feed end widths ($w$) create slurry build up along the side walls (2) which in turn results in cross current development, turbulence and destruction of effective stratification.

Increases in the nose width ($m$) reduce the fan-like nature of the discharged stream and lose the benefits obtained by the use of the instant type construction. The limits of variations in nose width ($m$) found allowable for this type separation have been established to be between three-eights inch and one inch. Below the lower limit too much turbulence through "particle interference" occurs and unit capacity is reduced, while with increases above the one inch limit, the accentuated separating characteristic of the lamellar or lamellar jet is lost. Between these extremes the nose width may be varied due to specific constructional considerations without significantly effecting the capacity or recovery rate of the unit.

Another factor which is critical to the operation of the device is the position of the splitter element 10 beyond the discharge end 3 (see Fig. 3b) in the zone of "free fall" (its adjustment in the vertical plane depends upon the particular type of separation; i. e., gravity separation or reagentized feed separation, and will vary therewith, as well as with differences in the various minerals separated in each type separation). The spacing of the splitting or cutting edge of the splitter 10 from the discharge edge of the nose width ($m$) of the trough, however, must be greater than zero in order to effectively separate the strata of the slurry flow. Extensive tests have indicated that for all types of separation, either gravity or reagentized feed, this distance may be varied between one-sixteenth to eighteen inches. It has been found that the desired flexibility of the unit, which is a requisite for separating a host of various sized natural mineral particles, dictates that the splitter cutting edge be positioned approximately one-sixteenth inch or more from the discharge edge of the sluice floor 1, in the zone of "free fall," the preferred distance being one-fourth inch.

From the above experimental data, it may be concluded that efficient "gravity-type" separation of various valuable minerals with a pinched-sluice type separator, may be obtained with a high percentage recovery and a resultant high acceptable grade of recovered minerals, if the sluice is constructed to have, (a) a slurry travel length of between thirty-six inches and forty-two inches, (b) side walls which converge at an angle between six degrees and sixteen degrees, (c) a feed end width which may vary between four and twelve inches, (d) a nose width which may vary between three-eighths and one inch, and (e) a slope (e) of the sluice floor which may vary between thirteen and twenty-three degrees, while maintaining a feed density (percent solids by weight) between fifty-five and seventy-two percent and a feed rate in the order of one ton per day (dry solids).

Fig. 2 illustrates variations in the percentage recovery for "reagentized feed" separations with variations in the length of slurry travel, the angle of convergence ($\alpha$), and the head feed rate (tons per hour). These curves have respectively been identified as A', B' and C'. Curve A' shows that the percentage recovery rises gradually from approximately fifty-six percent with a length of slurry travel twenty-four inches to a percentage recovery of approximately sixty-five percent at a length of slurry travel of thirty-three inches; at which point, the curve begins to curve sharply upwardly to a peaked maximum percentage recovery of approximately seventy-three percent beween slurry travel lengths of thirty-five and thirty-seven inches. Thereafter, the curve sharply breaks downwardly for lengths of travel in excess thereof. This curve indicates that maximum percentage recovery rates would be obtained with slurry travel lengths of the order of thirty to thirty-nine inches. However, the free choice of the travel length of the slurry is qualified by the grade of the recovered mineral concentrate which tends to depreciate below an acceptable commercial limit when the length of slurry travel is extended beyond thirty-three inches. The range of acceptable grades of concentrate, indicated between points 20 and 21 on the curve, occurs with a slurry travel in the neighborhood of between twenty-four and thirty-three inches, above which the grade of concentrate is less acceptable, and below which the percent recovery rate is too low for commercially practicable operations. This critical condition limits the recovery rate to between 55 and 65 percent. It must be remembered however that these tests, in the interest of providing a standard background, were made on a single ore. Other phosphate ores can be expected to produce variations from these results, but within similar narrow limits.

Curve B' illustrates the change in recovery rate with a change in the convergency angle ($\alpha$). For convergence angles of the order of six degrees and below, the recovery rate is in the neighborhood of fifty percent and lower. With an increase in the angle of convengence, the recovery rate gradually rises to a maximum of approximately sveenty percent at a convergence angle between thirteen and fourteen degrees. At this point the curve begins to tail off. The most efficient recovery rate is obtained with a convergence angle in the neighborhood of fourteen degrees; however, the highest percentage recovery obtainable with an acceptable grade of concentrate has been limited by the length of slurry travel to be in the range of 55 to 65 percent (see curve A'). It will therefore be apparent that the convergence angle may be varied between the limit of 6 degrees, where the recovery rate approximates 55 percent, to the upper limit of sixteen degrees, where the curve begins to again drop below 55 percent. This effective range is indicated by the bracket 22 in the figure. Again, this is from work on a single phosphate ore. Ores in which the quartz gangue grains are all significantly larger or smaller will show resultant minor variations in operating characteristics.

Curve C' illustrates the change in recovery rate with changes in feed rate (tons per hour of solids). This figure shows that maximum percentage recovery rate is obtainable with feed rates of the order of one-tenth ton per hour and less. From this maximum, the recovery curve progressively decreases with increases in the feed rate. Upon inspection of the curve, it will be noted that at a percent recovery rate of 55, the feed rate is five-tenths ton per hour; and since this is the minmum recovery rate for commercially practical operations established by curve A', use of feed rates in excess thereof would decrease the recovery rate below an acceptable limit, although the capacity would be increased. This curve sets the maximum feed rate, indicated at 23 on the curve, for an efficient operation of a pinched sluice-type separator for reagentized feeds to be five-tenths ton per hour. This provides a low recovery rate in the neighborhood of 55 percent ranging to a maximum at 65 percent with slight variations. The low recovery rate established by the above noted limitations, however, may be effectively increased through the use of multi-stage processing wherein the intial tailings may be effectively and economically reprocessed according to the disclosure hereinafter set forth.

No curves have been illustrated for changes in the recovery rate produced by variations in the slope (e) of the sluice floor or in the density of the slurry "reagentized feeds" since these factors are particularly limited by the commercially acceptable grade of the recovered product. Various tests have established that the slope of the trough, for reagentized feed separations, may have an allowable variation between nine and thirteen degrees inclination below the horizon. With greater degrees of inclination, the grade of the recovered concentrate becomes sharply depreciated and is generally unacceptable. This is due to turbulence, eddy currents, and lack of efficient stratification and separation in the slurry flow. The minimum limit is set where sandbarring occurs. With inclinations of less than nine degrees the separated waste materials fail to flow freely and collect in the trough creating sand bars which in turn produce turbulence, and "particle interference" in the flowing reagentized products, with a consequent untolerable reduction in the grade of the recovered concentrate. The recovery rate is also slightly reduced when exceeding either limit but is not particularly important.

The density of the slurry for this type separation has no minimum limit, but slurry densities in excess of thirty-five percent solids reduce the product grade below an acceptable limit with a slight reduction in the percentage recovery. With respect to both slope and density, the main consideration to be observed is to preclude turbulence and particle interference which would mix the waste materials with the flow of the upper reagentized valuable mineral strata to such an extent that the recovered concentrate is of too poor a grade to have effective commercial value.

As set forth above with respect to gravity separations, variations in the width of the feed end of the sluice, for reagentized feeds, are not critical within a fairly wide range. Experiment has established the lower limit to be at four inches, identical to that for gravity-type separations. The upper limit, however, is established at nine inches due to the effects that greater widths produce. With widths in excess of nine inches, the convergence of the trough creates turbulence and consequent depreciation of concentrate grade.

On the other hand, variations in the nose width ($m$) have separate critical limitations for reagentized feed separations. Extensive tests have indicated that for this type separation, the nose width of the trough may be varied between one-half and one inch without significantly effecting the capacity or the recovery rate of the unit. The lower limit is established where the separated waste or gangue materials have a tendency to sandbar at the discharge end creating turbulence and eddy currents. The upper limit of one inch is the critical distance beyond which increased widths will reduce the effectiveness of the strata separation produced in the lamellar jet of the free fall zone. This latter upper limit is undoubtedly attributable to the fact that an intermediate strata of clear water must be maintained between the reagentized upper suspended strata and the lower waste strata to prevent pickup of waste materials in the bottom portion of the upper strata which would reduce the recovered concentrate grade too much. Wider nose widths bring the bouyed valuable mineral containing upper strata into direct contact with the waste strata without benefit of a clearly defined intermediate water strata. This phenomenon also bears directly on the permissible variation in the feed end width set forth above in relation to the required lengths of slurry travel and variations in the convergence angle. One of the most valuable factors elucidated by research on the instant problems has been the discovery that the many prior examined constructions have all used nose widths beyond the above specified upper limit, which undoubtedly constitutes one reason for their failure to separate properly and to achieve industrial acceptance.

The above-noted limitations may be summarized as follows. The slurry should contain a reagentized ore content in which the slurry density is maintained below thirty-five percent solids. The pinched-sluice separator should be constructed to have a nose width between one-half and one inch, a feed end width of between four inches and nine inches, a travel (length) of from thirty to thirty-nine inches, and boundary side walls which converge from the feed end of the separator at an included angle of between six degrees and sixteen degrees. The pinched-sluice should also be positioned to incline with respect to the horizon, from its feed end towards its discharge end, at an angle of between nine degrees and thirteen degrees.

These limitations may be effectively controlled when utilizing a plurality of vertically superimposed conical separating batteries (such as are illustrated in Fig. 4) by supplying the mineral-bearing ore to the slurry flow at the rate of five-tenths ton per sluice, per hour, or less. The quantity flow of slurry fluid being regulated to maintain a density of 35 percent or less.

No charts have been illustrated for "dry" separations, wherein the materials are simply gravity fed over the separating segments without the benefit of an aqueous slurry, since the variations in the optimum constructional and operational features will differ significantly for each type material. The various critical factors may be indicated in broad ranges, however, as to require travel lengths of approximately 20 to 42 inches, a slope $\theta$ of between 30 and 40 degrees (dependent upon granule size and shape), a nose width ($m$) of between ½ and 2 inches, and a feed rate of between 0.50 and 2.5 tons per hour per segment; the convergence angle ($\alpha$) remaining the same.

In either case it may be desirable to provide agitation of the separating segments during travel of the material down the trough. This agitation should preferably be directed in the same direction as the direction of material flow in order to keep all material moving and eliminate sandbarring and due to the segregating effect of the converging trough need not be violent.

Reference will now be made to Fig. 4 in describing a particular application of my novel pinched-sluice type separating unit for the separation of phosphates from a mineral-bearing sand in a "reagentized-feed" type separation. Fig. 4 is a schematic sectional view of vertically superimposed separating units, each of which contains a plurality of pinched-sluice type separators, constructed as set forth above, arranged in an annular spoke-like array and having a general outline or configuration of an inverted frustrum of a cone. In this form of the invention it is proposed to supply a continuous slurry of mineral-bearing ores mixed with fluid reagents in a common fluid vehicle, such as water, to a plurality of separating units which may sequentially process the mineral bearing slurry to separate the valuable mineral therefrom. As is shown in the figure, this object is attained by providing a central tubular conduit or pipe 101 which extends vertically into the air for a distance of about 12' or 15'. Pumping means (not illustrated) are provided for continuously supplying the mineral-bearing reagentized feed slurry to this conduit or the slurry can be introduced to the initial distributor 102 by other means. Adjacent the upper end of the conduit is located a distributor standpipe or reservoir 102 for accommodating momentary stoppages or excessive pumping rates in the feeding system. This reservoir terminates adjacent to its connection with the feed pipe 101 in a circular flared chamber 103.

To this flared portion of the reservoir are connected a plurality of nipple member 104 (see Fig. 5), which are adapted to make a fluid conduit connection therewith, and to convey the mineral-bearing slurry to a plurality of flexible distributing hose or pipes 106 by means of a plurality of T heads. The T heads are connected to the distributing tubes 106 by means of adjustable standpipes 105, the pipes 105 being open at the vertical ends to eliminate unbalancing siphoning action. As shown in Fig. 5, the nipples 104 are twenty-four in number and have attached thereto an identical number of distributing tubes 106 which are adapted to convey individual streams of the mineral-bearing slurry from the reservoir 102 to the feed ends of a plurality of pinched-sluice separators 107.

Figure 7:
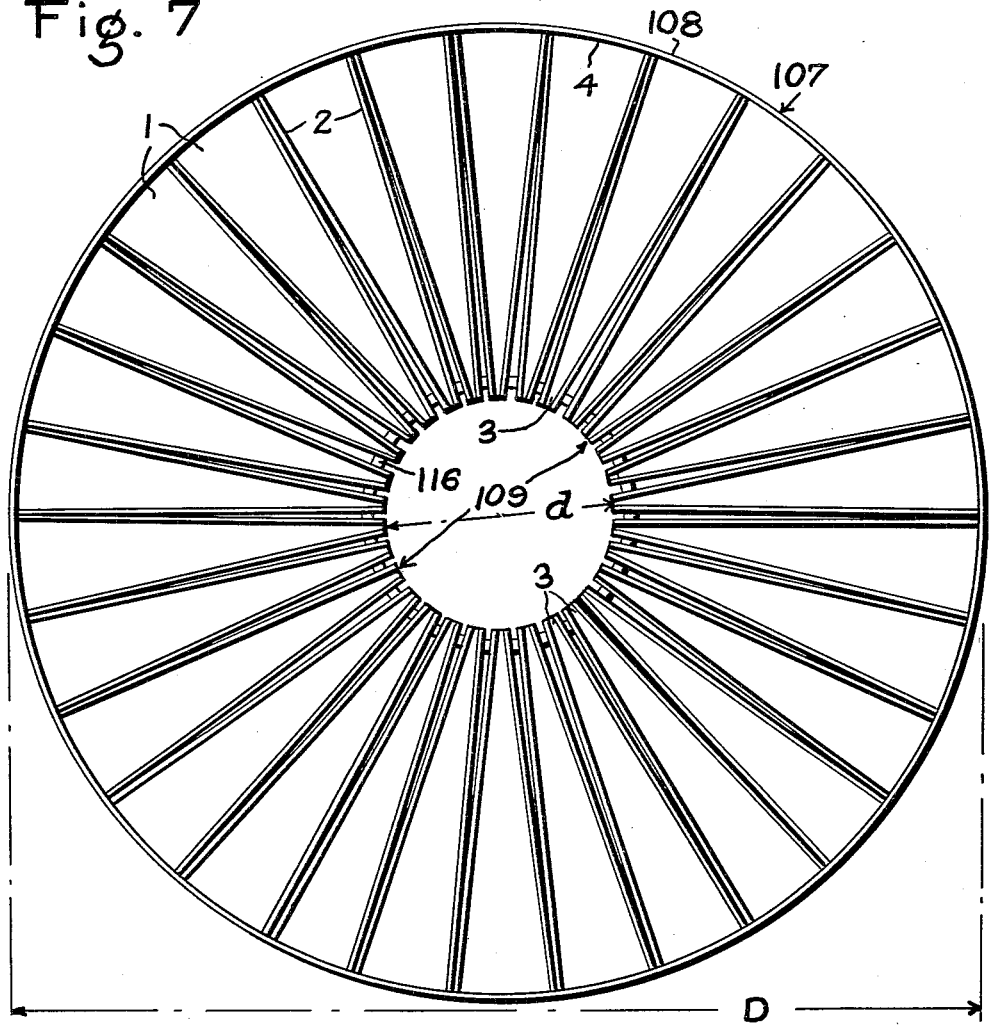
Fig. 7 is a schematic secctional view along the line 7—7 of Fig. 4 indicating the generally circular configuration of a single cone battery of individual sluices.
Figure 8:
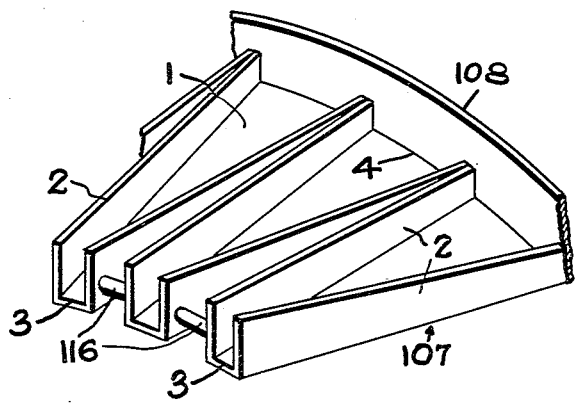
Fig. 8 is a fragmentary isometric view of the separating sluices constituting a single frusto-conical battery.

An inspection of Figs. 7 and 8 will provide a better comprehension of the exact constructional cooperation between the plurality of pinched-sluice units. As shown in Fig. 8, a plurality of separate trough-like separators, identical to that illustrated in Fig. 3a, are connected together side by side to form a single separating unit having the general configuration of an inverted frustrum of a cone. This is accomplished by disposing the individual sluices in a circular array so they in effect form individual spoke members of a wheel, the respective feed ends of the individual sluices being radially adjusted to present a circular periphery contiguously about the plurality thereof at the apex of the frustrum, and thereby form a central aperture 109 for a purpose hereinafter apparent.

The discharge ends 3 of the separate sluices are inclined with respect to the horizon at an angle of between nine and thirteen degrees to give the spoke-like formation its frusto-conical appearance. The plurality of individual sluices are held in this configuration by means of a peripheral rim member 108 which may be welded to, or otherwise secured to, the adjacent feed ends of the separating troughs or may be made up of joined integral parts of each segment. Additional connecting means such as spaced rods 116 (Fig. 8) may be provided between the adjacent side walls 2 near the discharge ends of the individual pinched-sluices, in order to insure the required rigidity in a single annular battery array.

In Fig. 4, four such frusto-conical separating units or batteries are illustrated as being vertically superimposed in stacked relationship about the feed pipe 101, and are respectively numbered as 107, 127, 137 and 147. It will be understood, however, that more or fewer batteries may be used dependent upon specific ore characteristics. Positioned adjacent the apex of each frustoconical separating battery is an annular sluice flow separating element 110. This separating element is constructed of tubular sheet metal, or similar material, and includes a depending sleeve portion 111, which surrounds, but is spaced from, the feed pipe 101, and a truncated conical portion 112 which integrally connects the sleeve portion 111 with an annular angularly extending peripheral splitter flange or lip 115. Each lip 115 is formed to have an edge which cooperates with the fluid flow discharged from the plurality of adjacent slurry sluices and separates it into two distinct portions or strata. A splash protector 113 composed of cylindrical section of either metal, plastic or water-repellent fabric material depends from the splitter flange 115 for a purpose hereinafter apparent.

Positioned immediately above the three lowermost frusto-conical separating units 127, 137 and 147, respectively, are a plurailty of distributing cone members (or distributors) 120, 130 and 140, respectively. Each distributor consists of a continuous sheet metal surface formed in the shape of a shallow cone and having an upstanding flange portion respectively identified as 121, 131 and 141 adjacent its apex portion. The central distributing cones (120 and 130) are positioned to surround the depending sleeves 111 of the adjacent splitter units 110. Suitable fluid sealing means 112, 132 may be provided between the sleeve members 111 and the respective distributor units. In the instant figure, such elements are disposed between the two central frusto-conical distributor members only; there being no need for such construction in the lower or last distributor unit 140 since its flange 141 extends within the third splitter 110 and makes a fluid tight seal with the feed pipe 101. As is shown in the figure, the separate separating units 110 which cooperate with the frusto-conical separators are substantially identical in construction, and each is adapted to be adjustably positioned vertically with respect to the adjacent discharge ends 3 of the individual sluices comprising the frusto-conical separating batteries. The lowermost splitter unit 110 does not require a splash protector 113 and none is shown thereon. Each of these funneled separating members or splitter units may be adjustably secured in the desired vertical position by means of a suitable leverage system hereinafter described.

Adjacent the splitter unit 110 which cooperates with the separating battery 137 is positioned a concentrate or waste-catching basin 135. This basin is constructed to have a generally tubular shape in the vertical direction which has a slightly larger radius than that of the central aperture of the frusto-conical separator 137. The tubular outer wall terminates in an annular bottom having a central aperture which forms a fluid tight seal with the sleeve 111 of the splitter 110. A spout or discharge conduit 136 is integrally formed with the catch basin and is adapted to convey the fluid waste materials to a remote point. An identical waste-catching basin is indicated at 145 adjacent the frusto-conical separating unit 147 and also includes a waste discharge conduit 146. Vertically disposed below the basin 145 is a concentrate catch basin 149 having a slightly smaller radius and also including a discharge conduit 150. As shown in the drawing, this latter catch basin 149 surrounds the sleeve extension 111 of the adjacent slurry splitting unit 110 and is adapted to receive fluid conveyed between the peripheral wall of the enclosed feed pipe 101 and the depending sleeve portion 111. The waste-catching basins 145 and 135 are adapted to collect and convey to a discharge receptacle the lowermost or waste-bearing stratum from the respective frusto-conical separators 147 and 137.

Suitable means such as a lever and linkage system may be provided for separately adjusting the splitter units within the discharge perimeters of the several batteries. One such means is illustrated in Figure 4 in connection with the splitter unit 110 of battery 137. As shown, this control means may consist of a pivoted lever 165 having a pivotal point suspended from a depending hanger 166 supported from the underside of the operating battery 137, an intermediate yoke portion (not illustrated) which surrounds and engages the splitter unit 110 immediately below lip 115 with a tight fractional grip and a control end which is freely movable. The lever includes an adjustable detent mechanism 162 composed of a square-headed bolt and a wing nut threaded thereon. The bolt is adapted to project laterally from the lever 162 through an elongated opening 161 in a bracket 160, supported from the depending heads of the battery frame work. The detent mechanism is thereby enabled to selectively lock the lever 165 in any desired vertical position within the extent of the elongated slot 161 by the simple expedient of tightening the wing nut 162 to clamp the lever 165 between it and the adjacent bracket 160. As shown, the pivotal end 166 of the lever is positioned relatively close to the discharge perimeter end of the battery whereby relatively long vertical movements of the control end of the lever induce a much smaller vertical movement of the splitter movement 110. This provides an exceedingly simple and efficient structure for positioning the splitter unit accurately and precisely.

Figure 6:
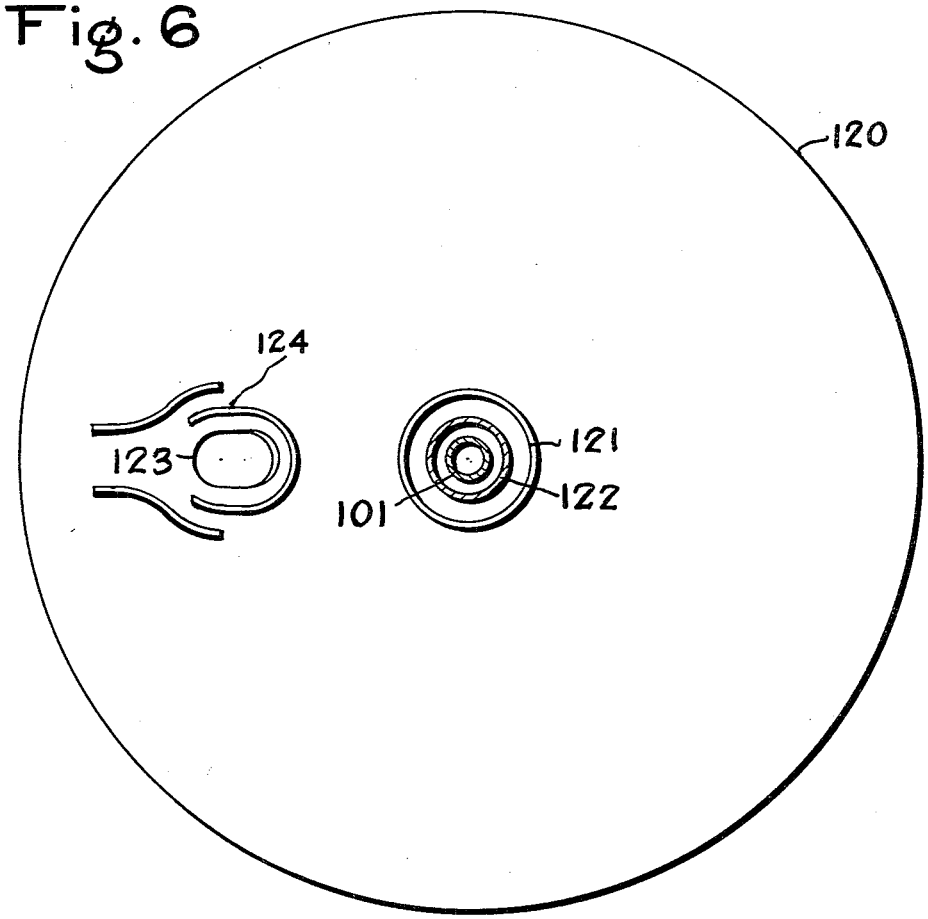
Fig. 6 is a sectional view along the line 6—6 of Fig. 4.

Figure 6 illustrates an alternative way of mounting the control lever 165. In this figure the distributor 120 includes an elongated slot 123 approximately in the mid position of its truncated periphery. Suitable fluid deflectors 124 are positioned about the opening 123 and are adapted to guide the slurry flow thereabout. With this construction it is possible to mount a control lever such as 165 of Figure 4 through the elongated slot 123 whereby it may have a yoke connection with the depending sleeve 111 of the next vertically adjacent splitter unit to thereby control the elevation of such unit in the vertically adjacent battery, the pivotal end of the lever being supported dependingly from the underside of the distributor at a point diametrically opposite the elongated opening 123.

The opening 123 may also be used simply as an inspection port or may be availed of as a means of introducing a pipe carrying spray water into the battery which through suitable conventional fittings, located within the confines of the distributing cone, may be directed upon the feed as it drops off of the distributor onto the feed ends of the individual sluices. In "reagentized feed" separations it is often desirable to provide such spray water in the form of fine jets at the point of feed introduction into the separating segments. These spray jets are normally directed 180 degrees out of phase with the direction of slurry flow and function to wash and break up reagentized granule agglomerations and to introduce air bubbles in the slurry which aid in floating the "unwet" valuable granules. The use of spray water will not be essential in all forms of separation but will be necessary in some, and the port 123 provides a convenient way of introducing the water into the separator structure whenever desired while being capable of functioning as a simple inspection port or as control linkage guideway when spray water is not desired.

Alternatively, suitable hydraulic or electric means may be provided for adjusting the separate splitter units 110. It is contemplated that such remotely controllable actuating structures may take the form of a fluid servo mechanism mounted adjacent the splitter elements 110 in a manner well known in the servo motor art. The electrical control means may take the form of a solenoid control mechanism wherein the splitter element 110 (preferably its depending sleeve position 111) may constitute the armature portion thereof, the actuating coil being mounted externally concentric thereto, or as a surface layer surrounding the feed pipe 101. It will be appreciated that these examples are merely illustratively cited of the many variations common to the linear actuator art.

A brief description will now be made of the process according to the instant invention for separating valuable minerals, such as phosphate, from associated gangue materials by means of the apparatus of Figure 4. In practice an ore mixture containing phosphate and associated waste sands is continuously fed into a flowing stream of an aqueous solution. In order to enhance the separation between the valuable phosphate mineral and the worthless waste sands the ore should be treated with reagent prior to introducing it into the flowing stream. It is conventional practice to add any of the many well known chemical reagents in the reagentizing process in order to increase the stratification between the valuable and waste mineral positions over and above that induced by their different buoyancies. This process is known as a "reagentized feed" separation wherein the valuable mineral content, herein indicated to be phosphates, becomes associated together in intimate relationship as a floating layer in an upper stratum in the aqueous solution. The chemical reagent also functions to allow the worthless gangue materials to be wet to decrease their buoyancy, thereby causing such mineral substances to sink to the bottom of the aqueous solution, providing a distinct demarkation line between the upper phosphate bearing stratum and the lower waste bearing stratum whereby the two may be conveniently separated. As before related, this separation is further speeded by causing such aqueous mineral bearing solution to flow as a slurry whereby the fluid velocity further contributes towards creating and maintaining a distinct demarkation between the two strata.

It has been found that the percentage yield may be greatly increased, as well as the overall economy in the separating operation, by observing the limitations noted previously with respect to this type of mineral separation. In the instant case this desirable result is obtained by causing the reagentized, ore-bearing aqueous suspension to be continuously pumped (by conventional apparatus not illustrated) or otherwise delivered, from the reagent conditioning apparatus, together with a controlled amount of water and feed. In this type of operation the valuable mineral bearing ore, either uncrushed or comminuted to a size of between 8 to 200 mesh, is continuously fed into the reagentized aqueous stream at a rate such that the slurry density is maintained at or below 35% solids. The slurry is then pumped or otherwise delivered through the feedpipe 101 to the standpipe 102 where it is discharged via the nipples 104 and the distributing hoses 106 to the feed ends of the plural pinched-sluice units of separating battery 107. From this point the mineral-bearing slurry flows down the converging sloping surfaces of battery 107 to the discharge perimeter 109. As previously stated, this simultaneous converging and slowing of the slurry flow increases the stratification of the valuable mineral and waste portions. At the discharge perimeter the separate stratum spurt out as effluent fans in a zone of free fall, these fans are positively separated at the splitter lip 115. The upper phosphate bearing stratum discharges within the funnel contour of splitter unit 110 and thence through the annular chamber between pipe 101 and sleeve 111, through the next lower splitter funnel units, on to the lowermost distributor 140. In the meantime, the lowermost waste bearing stratum drops beneath the splitter lip 115 on to the surface of distributor 120 which disburses it in a controlled manner to the feed ends of the separating units of the next battery 127 where much of the remaining phosphate content is separated via the splitter unit 110 in like manner to that described previously; the ensuing waste stratum dropping onto the surface of the second distributor 130 which conveys it to the feed ends of the third battery 137 for a subsequent separation of most of the remaining phosphate particles. In this latter separation all of the phosphate has been removed from the slurry, so far as practical in commercial operations, and the discharged waste bearing portion is collected in a catch basin 135 and thence conveyed to waste. The phosphate stratum from the first three separating batteries are combined into a single fluid flow in the third splitter funnel 110 and are reseparated in the battery 147. The waste sand cleaned from the concentrate are collected in catch basin 145 and recirculated to 102 for recleaning and the phosphates are collected in basin 149.

In practice, the splitter units for batteries 107, 127 are positioned to split the slurry lamellar jets in any proportion desired. By this system the instant apparatus and process provides an exceedingly efficient and economical means for ensuring a high grade of recovered mineral ore while simultaneously obtaining a high degree of efficiency in the separating operation.

An alternative method of feeding the mineral bearing slurry to the separator apparatus may be practiced by conveying the aqueous vehicle up through the pipe 101 to the chamber 103 in a continuous manner. At this point the reagentized mineral bearing ore may be discharged downwards through the standpipe 102 to mix with and be carried by the upwardly flowing aqueous stream through the discharge nipples 104 and distributing hoses 106 to the feed ends of the respective sluice units of the battery 107. This type of operation provides an exceedingly effective arrangement for controlling the density of the slurry discharge. In practice it has been found that with twenty-four nipples 104, each having a diameter of three-fourths inch, the desired density of 35% solids or less may be maintained in the slurry flow by controlling the feed rate of the mineral bearing ore discharged through the standpipe 102 to be approximately five-tenths ton per hour per pinched-sluice, or less; the aqueous flow being pumped at the rate of approximately 5000 gallons per hour, or more.

A structure, built according to Fig. 4, employing forty pinched-sluice units with feed end widths of six inches for the first battery 107 and thirty pinched-sluiced units with feed ends of eight inches in the subsequent batteries, 127, 137 and 147, and while observing the feed rate and density limitations above noted, has experimentally produced recoveries of ninety-four percent for a reagentized feed separation of phosphates with a very high grade being maintained in the recovered mineral. The capacity of the unit was demonstrated to approach sixteen tons of ore per hour without detrimentally affecting the overall recovery or grade of the phosphate product. It will thus be apparent that the vertically stacked frustro-conical separating batteries of the unit of Fig. 4 provide a combined capacity, recovery rate and product grade hitherto unobtainable in the reagentized separation field. Another extremely advantageous feature of the frustro-conical arrangement of sluices of Fig. 4 may be appreciated from the following computations which illustrate the comparative ease of computing the various variable values for a given type operation. In describing the various variables, reference will be had to Figs. 1, 2, 3a and 7, wherein the separate symbols indicate the constructional features represented in the following formulae.

From Fig. 3a it will be seen that the length of slurry travel is denoted as T so that the diameter, D, of a multiple-sluice battery (see Fig. 7) may be expressed as follows:

$$D = 2T \cos \theta + d$$

where:

$D$ = diameter of battery
$d$ = diameter of discharge perimeter
$T$ = length of slurry travel
$\theta$ = inclination of the individual sluice and where:

$P$ = perimeter of the battery $$P = pi\,(2T \cos \theta + d)$$

and since the individual feed end widths of the separate pinched-sluices approximate the perimeter configuration $$P \cong Nw$$

where:

$N$ = number of individual sluices
$w$ = width of individual sluices hence:

$$Nw = pi(2T \cos \theta + d) \text{ or } N = \frac{pi(2T \cos \theta + d)}{w}$$

From the chart of Fig. 1 it can be seen that for gravity separations the capacity of a single sluice is approximately equal to one ton per hour, or:

$$c = 1$$

where $c$ = capacity of single sluice (T/hr.)

$$\therefore C = Nc = N(1)$$

where:

$C$ = capacity of entier battery (T/hr.)
$N$ = number of sluices in battery hence for "gravity separations"

$$\text{Max. } C \cong \frac{(2T \cos \theta + d)pi}{w} \text{ (tons/hr)}$$

For reagentized feeds, the chart of Fig. 2 indicates that the capacity ($c$) of a single sluice is limited to .5 ton per hour. Therefore for reagentized feed separations:

$$c = .5 \text{ (ton/hr.)}$$

and $$C = Nc = .5N$$

and since $$N = P/w$$

$$\therefore C = .5 \ P/w$$

hence for "reagentized feed" separations:

$$\text{Max. } C = \frac{.5(2T \cos \theta + d)pi}{w} \text{ (tons/hr.)}$$

or $$\text{Max. } C = \frac{(2T \cos \theta + d)pi}{2w} \text{ (tons/hr.)}$$

It will thus be seen that the circular arrangement of the individual pinched-sluices into a conical formation also facilitates the calculation of the constructional dimensions for a given type separation procedure. It will be further noted that the above formulae for capacities demonstrates the unexpected result that maximum capacity is obtained with smaller individual feed end widths ($w$) above the lower limits set by the convergence angle ($a$) of Figs. 1 and 2 (the nose width (M, Fig. 3) being regulated within narrow limits as set forth previously).

Figure 9:
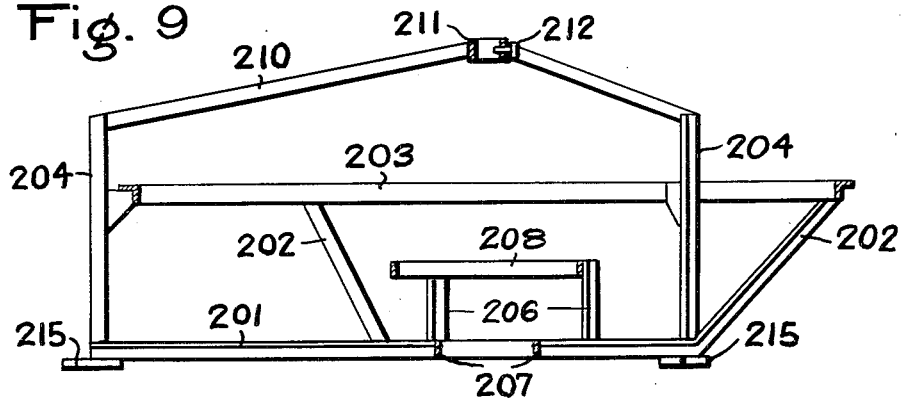
Fig. 9 is a side view of a modified form of supporting structure for a single conical sluice array.
Figure 10:
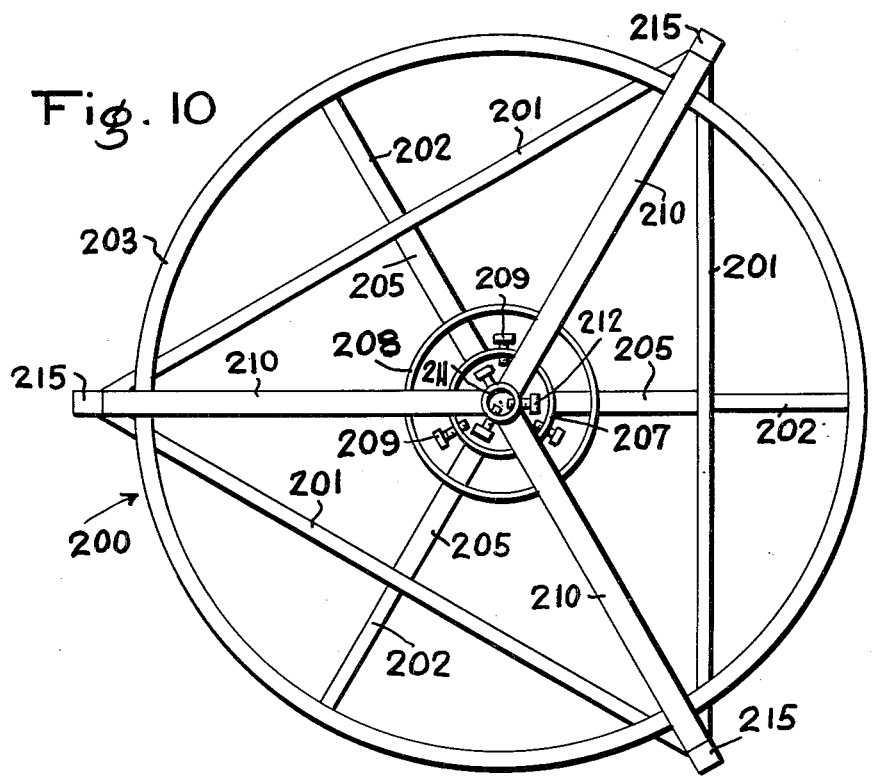
Fig. 10 is a top plane view of the support of Fig. 9.

Figs. 9 and 10 illustrate a modified form of mounting structure which may be used to support the vertically stacked separating batteries of Fig. 4. This support consists of a triangular base section formed from three interconnected braces 201 and vertically projecting stanchions 204 which extend from each apex of the triangular base. The latter may be firmly connected to the base as by welding or riveting, etc. An inwardly projecting arm or brace 210 extends from the upper end of each stanchion and terminates in a centrally positioned support ring or collar 211 which may be integrally attached thereto as by welding, etc. This central ring or collar 211 contains a plurality of adjustable set screws 212 (see Fig. 10) which are adapted to adjustably center the supporting structure about the central feed pipe 101. The outer ends of arms 210 may be detachably connected to legs 204 for a purpose hereinafter apparent.

The triangular base also has a second group of vertically, but angularly, projecting legs or stanchions 202 which extend outwardly from the respective center points of the base braces 201 and terminate in a common horizontal plane. A circular support member or ring 203 is positioned on the upper ends of these legs and is fixedly connected therewith as by welding, etc. This latter ring forms a continuous rigid support for the feed end periphery of a separating battery. A group of horizontally projecting short braces or arms 205 are positioned on the braces 201 of the triangular base, opposite the angularly extending legs 202, and extend inwardly towards the center of the triangle where each terminates in a center rim or ring member 207. This ring member is positioned to be concentric to a vertical center line through the center of collar 211 and includes adjustable set screws 212 for centering the splitter funnel unit of the separating battery within its circumference.

Another group of perpendicular legs 206 extend vertically from the arms 205 and terminate in a second horizontal plane. A second, smaller sluice supporting rim or ring 208 is placed on the upper ends of legs 206 and is adapted to support the separating battery adjacent its discharge perimeter. This second ring may be formed to be detachably connected to the ends of legs 206, as by means of bolts, etc., for a purpose hereinafter apparent. This ring member is also centered with respect to a vertical center line through the collar 211.

Additional support arms 215 are integrally connected to the triangular base at the apices thereof and project outwardly to form a plurality of platforms that may be supported in any conventional manner from a vertically erected tower.

Figure 11:
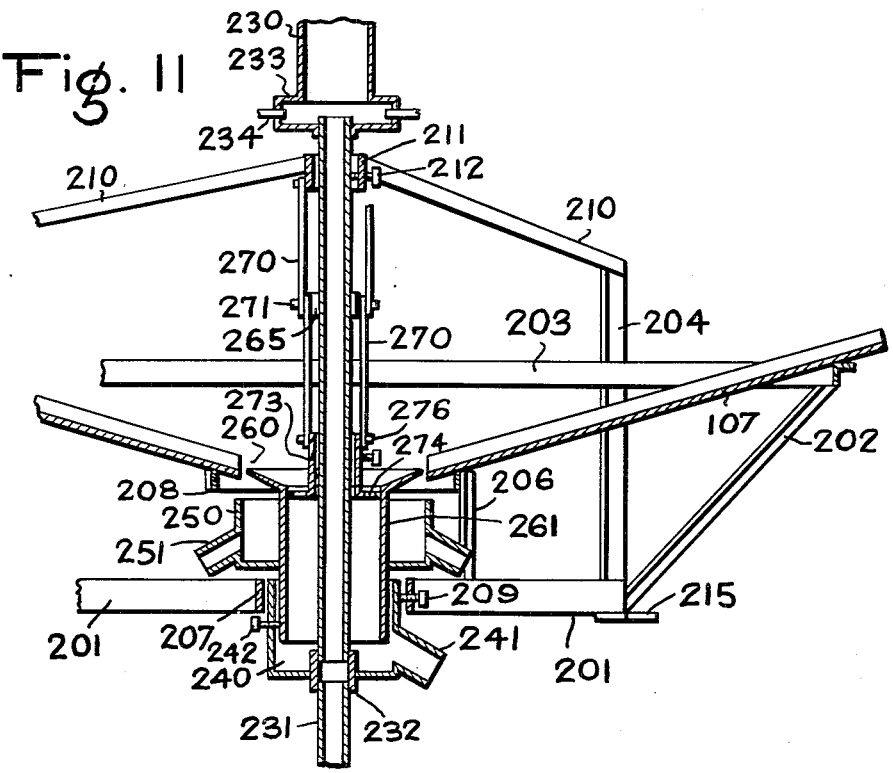
Fig. 11 is a fragmentary sectional view of the support of Fig. 9 in cooperation with a modified form of conical separating battery and splitter assemblage.

Fig. 11 illustrates the application of the mounting or supporting structure of Figs. 9 and 10 in suspending a separating battery such as 107 of Fig. 4 about a vertical feed pipe. In this figure, however, the feed pipe and splitter unit constructions are illustrated to be of a modified type, although it will be recognized that the principles demonstrated are equally applicable to a separator battery identical in construction to those of Fig. 4. As shown, the feed pipe is of essentially the same form as that of Fig. 4 (the standpipe 230, chamber 233 and nipples 234 corresponding to those of Fig. 4), but is constructed to be in separate sections, 231, which may be assembled together during erection of the unit as by means of coupling sleeves 232. The sleeve may be formed integrally with a bucket type catch basin 240 (as shown), or independently thereof for use in such structures as the phosphate separator of Fig. 4.

The splitter unit is illustrated to be of a modified type which is particularly advantageous for high grade ores in which only a single process separation is necessary, and in addition to the catch basin 240, includes the usual type of splitter funnel 261, which is positioned to depend into the catch basin 240 for a purpose hereinafter apparent, and a second catch basin 250 formed integrally with the splitter funnel 261 to provide an annular fluid chamber thereabout. With this construction the fluid discharged from an adjacent separator perimeter is split by the lip of funnel 261 to drop, in separated portions, into the two catch basins, 240 and 250, from which it may be conveyed to remote points via discharge spouts 241 and 251, respectively.

In assembling the apparatus in the triangular support unit, the catch basin 240 is first positioned within the support collar or ring 207 and the set screws 209 adjusted to center it therein. Thereafter the splitter funnel 261 and associated basin 250 is positioned within the basin 240 and centered by means of set screws 242 carried by basin 240. The inner, battery supporting ring 208 is then positioned on the extended ends of legs 206 and firmly affixed thereto, as by bolting. Thereafter, the multiple-sluice battery 107 is positioned over the support rings 203 and 208 and remains suspended thereby. The sluice battery may be semi-permanently held in a centered position by means of removable abutment pins (not shown), which may be placed therein to abut against the surfaces of rings 203 and 208, and position its discharge perimeter 260 concentrically about splitter funnel 261.

After the sluice battery is in place, the upper arms 210 and integral collars 211 are connected to the upright stanchions 204 in the manner previously described. Thereafter the upper feed pipe section 231 is inserted through the collar 211 and coupled with sleeve 232, the set screws 212 being adjusted to center the support unit and therewith the sluice battery 107 and splitter unit 261 about the feed pipe 231 as a center.

It will thus be seen that the instant construction provides a simple structure which is easily assembled and disassembled and which is adaptable to interchangeably cooperate with different sized multiple-sluice batteries and different type splitter funnel units. It will be appreciated that suitable set screws 209 may be provided to cooperate with different splitter structures such as the splash sleeve 113 of the splitter unit 110 in Fig. 4, or the splitter sleeve 344 of the multiple-splitter funnel unit described infra with reference to Fig. 12.

The numerals 270 in Fig. 11 indicate two sets of toggle arms on opposite sides of pipe 231 which may be pivoted together as at 271. The upper arms are pivotally connected to the collar 211 to depend therefrom, while the lower arms are pivotally connected to a reciprocating sleeve member 273 which is integrally connected to the splitter funnel 261 by means of spaced rib members 274. The central pivots 271 of each toggle is in turn pivoted to the respective arms of a yoke member 265 (only the ends of which are shown) which may be reciprocated toward and away from the feed pipe to raise and lower the splitter funnel within the discharge perimeter 260. A set screw may be provided in sleeve 273 to center it about the feed pipe for reciprocation thereover when actuated by the yoke member 265 via toggle linkage 270. This construction provides a modified form of actuating linkage for the various type splitter funnel units and be used interchangeably therewith. Its particular advantage resides in the fact that the yoke member 265 may be actuated by a conveniently located fluid servomotor or solenoid, or by a pull cord or chain.

No distributor (such as 120 of Fig. 4) has been illustrated in combination with the multiple-sluice battery 107 in Fig. 11, but it will be readily appreciated that such may be provided by the simple expedient of placing the base perimeter of the distributor cone on the upper surface of the battery 107 prior to positioning feed pipe 231 in the assembly. The frustrum of the distributor cone may be conveniently formed to surround the lower edge of the collar 211 whereby a fluid seal can be easily inserted therebetween. In such cases, the toggle linkage 270 may be dispensed with, or alternatively, supported from extensions on the collar 211.

Figure 12:
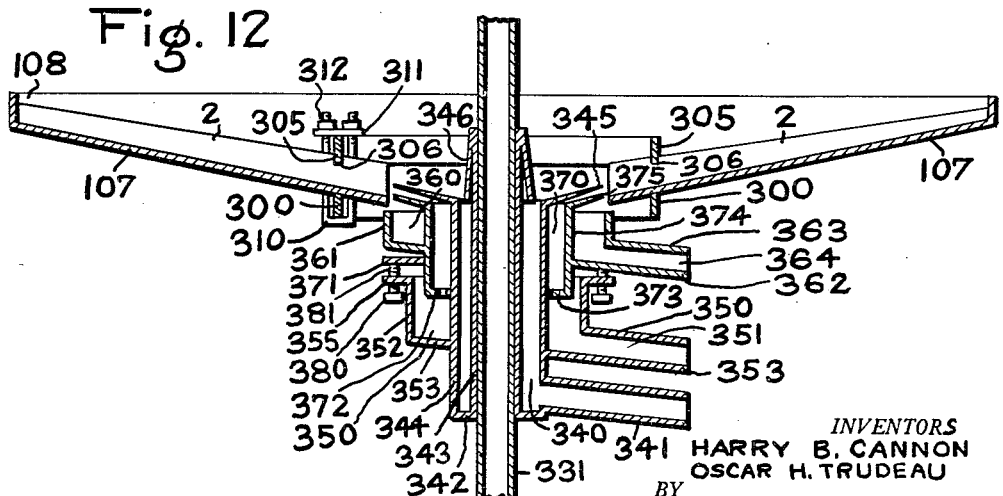
Fig. 12 is a schematic sectional view of another form of separating battery and splitter assemblage.

Fig. 12 illustrates a further modified form of the instant invention, particularly with respect to the mounting structure for supporting the separating battery and the splitter unit construction. In the figure, 107 designates the previously described truncated cone arrangement of a plurality of pinched-sluice type individual separating units. This form of the invention is adapted to provide a multiple strata separating action for the fluid flow contained within the individual triangular troughs of the separator battery 107 and include a plurality of vertically-spaced splitter elements 345 and 375, respectively. These splitter elements are both constructed in the same form as those previously described and constitute upwardly and angularly extending peripheral flange elements having a circumferential edge rim spaced approximately ¼ inch away from the perimeter formed by the discharge ends of the individual sluices. Each separating flange or lip is integrally connected with a vertically depending sleeve portion, 344 and 374 respectively, which depends therefrom. Each sleeve terminates at its lower vertical extent in a horizontally flat inwardly directed rim portion, indicated as 342 and 372, respectively. As will be more clearly understood from an inspection of the figure, the slurry separating flange or lip 375, its integral sleeve 374 and bottom flange surface 372 are reciprocably mounted over the tubular sleeve 344 with a fluid tight joint therebetween. This construction permits the depending sleeve portion 374 and its integral inwardly directed bottom flange 372 to cooperate through the fluid tight seal between such bottom flange and the adjacent exterior wall of the sleeve 344 to provide a toroidal slurry receptacle in the space between sleeve 344 and sleeve 374.

The bottom flange 342 connected to the vertical depending edge of the tubular sleeve 344 has integrally connected therewith a second and smaller vertically extending tubular sleeve portion 343. The sleeve 343 is designed to extend vertically above the uppermost edge of the spaced tubular sleeve 344 to a distance substantially above the top edges of the adjacent side walls 2 of the individual sluices in the separator battery and terminates in an angularly and downwardly directed cone-shaped flashing 346 which is adapted to prevent spray from entering within the chamber formed by the tubular sleeve 343 and feed pipe 331. It will thus be seen that the concentric tubular sleeves 343 and 344 with their integral bottom flange section 342 form a second slurry fluid receptacle which is generally indicated by the numeral 340. Adjacent the lowermost portion of this receptacle 340 there is provided a discharge conduit or spout 341 for conveying the slurry fluid therein contained to a remote point.

Vertically disposed above the discharge conduit 341, but spaced therefrom, is an annulus-like toroidal basin or receptacle 350 formed by a tubular sleeve 352 which surrounds but is radially spaced from the tubular sleeve 344 and has an integral sloping bottom surface 353. Adjacent one side of the toroidal receptacle a portion of the sleeve's wall 352 is flared outwardly to cooperate with the sloping bottom surface 353 to form a discharge spout or conduit 351. The toroidal basin 350 may be initially fabricated to have a central cut-away portion or hole in the sloping bottom section 353 which fits tightly over the tubular sleeve 344 and is secured thereto permanently as by welding or soldering, or a like operation. This construction enables the central portion of the sleeve 344 to cooperate with the radially spaced tubular sleeve 352 and the sloping annulus bottom section 353 to provide a toroidal fluid receptacle within the annular chamber 350. Adjacent the vertical edge of the circular sleeve 352 is positioned an outwardly directed perpendicular flange 355 for the purpose hereinafter explained. As will be seen from an inspection of the figure, sleeve 352 is vertically positioned to encompass the depending portion of the annular chamber 370 and is adapted to receive the fluid slurry discharge recovered within said chamber by means of gravity discharge through ports 373 in the bottom wall 372 of such annular chamber.

Vertically positioned above the peripheral flange 355 of the annular receptacle 350 is a second toroidal fluid receptacle generally indicated as 360. This catch basin is formed by a tubular sleeve 361 having an integral and angularly sloping bottom section 362. A discharge spout 364 is formed by an extension of the sloping bottom portion 362 and an outwardly directed angularly extending section 363 of the tubular sleeve 361. The fabrication of this receptacle may be similar to that of the receptacle 350 and includes providing a centrally located circular cut-out portion or hole in the bottom 362 which is adapted to tightly surround the outer wall 374 of the fluid chamber 370. This circular cut-out portion is positioned approximately in the mid portion of the annular chamber 370 and may be integrally connected to the outer sleeve wall 374 thereof by any conventional means, such as welding or soldering. The radial extent of the fluid receptacle 360, so formed, is designed to be slightly in excess of, or approximately equal to, the central aperture in the apex of the inverted truncated separator battery for the purpose hereinafter explained.

Positioned vertically intermediate the chamber 360 and the peripheral flange 355 of the chamber 350 is a circular peripheral flange section 371. This flange is integrally bonded to the outer sleeve 374 of the chamber 370 and terminates adjacent the arcuate section of the sleeve 374 wherein the sloping bottom portion 362 is integrated therewith. The flange 371 and the underside of the sloping bottom wall 362 form an abutment flange about the periphery of chamber 370. The peripheral flange 355 on the chamber 350 has spaced threaded holes therethrough which are adapted to receive adjustable wing bolts 380 and the tip ends 381 of the bolts are adapted to abutt the underside of the flange 371 and the sloping wall 362 to vertically adjust the spacial position of the integrated chambers 360 and 370, and the splitter segment 375 integrally carried therewith. By this construction it will be readily appreciated that the splitter segment 375 may be manually adjusted with respect to the splitter element 345 within the discharge perimeter at the apex of the conical separator. The other splitter segment 345 may be vertically adjusted by any suitable means, as by raising and lowering the chamber 340.

A further feature which is illustrated in the instant form of the invention is the novel supporting structure provided for the inner sloping ends of the individual triangular sluices of the separator battery. As shown in the figure, a pair of spaced annular support members 300 and 305 are positioned vertically above one another adjacent the discharge perimeter of the frusto-conical separator. The annular support ring 300 is positioned beneath the undersides of the individual sluices of the cone arrangement, while the annular support ring 305 is positioned on the sidewalls of the individual sluices. The side walls 2 of the individual pinched-sluices may be slotted as illustrated at 306 to accommodate the lowermost edge of the ring 305. A plurality of U-bolts 310 are positioned in the interstituial spaces between the side walls 2 of the adjacent spaced discharge noses of the separate pinched-sluice units and are adapted to cooperate with a plurality of end bearing plates 311 positioned over the extended legs of the U-bolt to securely lock the spaced angular rings 300 and 305 with the supported sluice units therebetween into and integral and rigid structure as by means of adjustable lock nuts 312 threaded over the extended legs of the U-bolt 310.

The above support structure provides an extremely efficient and structurally effective support means for separator cone units within a vertical battery array, such as that disclosed in the construction of Fig. 4. In practice, the unit would be assembled by positioning the lower end unit support ring 300 beneath the inverted frusto-conical battery of sluices, then the second support ring 305 would be placed over the top of the sluices and into the slots 306 in the side walls 2, and then a plurality of the U-bolts with their cooperating clamping plates 311 would be inserted over the rings at spaced intervals between adjacent sluice units and adjusted to clamp the support rings 300 and 305 into tight frictional engagement with the lower ends of the sluices and frictionally bind them therebetween by threading the lock nuts 312 down beyond the extended legs of the U-bolt.

The outer rim or perimeter of the separator battery may be supported by a circular member or ring, such as 151 of Fig. 4, and suitable reinforcing ribs or arms could be spaced between such ring and the ring 300 and fixedly connected therewith in any suitable manner. Such construction provides a very simple and inexpensive support structure which may be easily suspended from conventional tower structures.

Fig. 13 illustrates a still further modified form of the invention for separating heavy valuable minerals from a mineral-bearing aqueous slurry in a "gravity type" separation operation. This figure illustrates a flow sheet for the multi-stage separation of heavy minerals by a "gravity feed" or "heavy media" separation and is technically known as a countercurrent, recirculation separation process. As shown, four separate separators respectively indicated as the first, second, third and fourth, are used to sequentially process mineral-bearing ore which may be initially fed into the first separator. The structures utilized as the first, second and third separators may be built in accordance with the construction of the conical battery and multiple splitter unit illustrated in Fig. 12, while the last or fourth separator may be built in accordance with the construction of the battery and single splitter unit illustrated in Fig. 11. It will thus be apparent that the first three separators are adapted to divide the slurry flow into three respective portions, respectively, constituting a tailings, a middlings and a concentrate; while the fourth separator structure is adapted to separate the slurry flow into only a concentrate and a tailings portion, respectively.

In this form of the invention the ore originally fed into the first separator is processed during travel down the individual sluices of the frusto-conical battery as set forth previously, and is discharged at the respective nose of the battery sluices into separate containers as a tailings, middlings and concentrate portion, respectively; being effectively diverted thereinto by a plurality of slurry splitters or lips such as 344 and 375 of Fig. 12. As will be apparent from an inspection of the figure, the tailings portion alone is directed to waste; the concentrate portion being directed or fed to the second separator while the middlings portion is recycled back into the separator with the initial ore feed. In practice, this recycling may be accomplished by the simple provision of a suitable launderer structure, including a sump and a conventional slurry pump (neither of which are illustrated).

The concentrate portion of the first slurry flow discharged from the first separator is fed through a conventional conduit or launderer structure into the second separator where it is processed in like manner and redivided into a second tailings, middlings and concentrate portion. The second concentrate portion from the second separator is then fed directly into the third separator. The second middlings portion is recycled back into the second separator with the concentrate portion from the first separator in identical manner to the recycling of the middlings portion of the first separator; while the second tailings portion is returned to the initial feed of the first separator in conjunction with the first middlings.

The second concentrate portion discharged from the second separator is directly fed into the third separator where it is reprocessed in an identical manner. The third concentrate portion is discharged from this third separator is then fed directly in the fourth separator; the third separator, and the tailings portion being recycled into the feed of the second separator.

The third concentrate portion discharged from the third separator is once again processed into the fourth separator and upon discharge therefrom is split into a fourth concentrate portion, representing the final product, and a fourth tailings portion which is returned to the feed of the third separator, as indicated in the figure.

As will be apparent from the above description, the initial ore is divided and subdivided while being simultaneously processed and reprocessed whereby essentially all of the valuable mineral content is effectively separated and divorced from the waste or gangue materials so that the ultimate product is one of exceptionally high grade. The provision of only a single discharge to waste, and that in the initial or first separation stage effectively precludes any appreciable loss of the heavier valuable mineral content.

In practice the above results also can be obtained by using a full circular battery of pinched sluices for the initial or rougher separator constituting an accurate segment of a full circular battery for the subsequent separators (2nd, 3rd, and 4th). This innovation readily accommodates the progressively decreasing volume of slurry without requiring a change in size or shape in the individual sluices.

In this type process the effect of slope variation and head feet grade has a direct bearing on the percentage recovery in that the relative proportion of "density" or "high specific gravity" values progressively increases in each succeeding separator structure. It thus becomes desirable to vary the slope of the segments in the succeeding separator structures, as previously noted, such that the slope ($\theta$) in the first separator battery may approximate 15° while that of the second separator may approximate 18°, and that of the third separator may approximate 21°, the slope for the fourth separator being substantially the same as that for the third, or in some cases slightly more, such as 23°. Naturally it is possible to deviate from the above noted limits without destroying the effectiveness of the separation.

It will be obvious that there are many permissible variations in processing heavy mineral-bearing ores in the above-noted apparatus; such as by simply eliminating the first or the second separator stages, particularly where a very high grade ore from which maximum recovery would be required, is used as the initial feed; or by introducing a high grade ore into the apparatus at the third separator instead of in the initial separator, whereby the subsequent reprocessing and recycling of the tailings and middlings discharged from the third separator into the first and second stages would merely function as a scavenging in lieu of a bona-fide separating action. In the latter case, the slope of the first and second separator batteries could be maintained at approximately 15° since there would be no excessive quantity of heavy "values" in the recirculated slurry flow, while the slope of the third separator should preferably be increased to approximately the maximum limit of 23°, although it will function effectively with an inclination of approximately 18° or below.

In some installations it may be desirable to mount the four separation stages in vertical alignment in a manner similar to that of Fig. 4 (including the provision of a distributor for each separating battery). In such case it will be possible to utilize a central feed pipe similar to pipe 101 of Fig. 4 to function as a center guide in mounting the separate separator batteries in addition to operating as a riser for an aqueous slurry carrier (the dry ore being introduced thereinto at the upper end 102) or for a mineral-bearing slurry, as desired. With such an arrangement the multiple splitter units of the first three separating stages may be slightly modified in construction from that shown in Fig. 12 to the extent that the concentrate basin 361 may be enlarged to protrude outwardly at a greater radial distance from the feed pipe than the middlings and tailings basins so that suitable provision, such as dropout holes, may be made for expediently directing the concentrate to the succeeding and next lowermost separator by simple gravity action.

In conducting a countercurrent recirculation separation process according to Fig. 13, the limitations set forth previously with respect to feed rate and slurry density should be observed. Thus the density of the slurry should be maintained between 55 to 72% dry solids while feeding the ore into the initial separation stage (regardless of which separator battery it is introduced into, i. e., first, second or third) at a rate of between one (1) and one and one-half (1½) tons per hour per sluice segment. Preferably, with a simple "gravity feed" separation using the first separator (Fig. 13) as the initial separation stage, the density should approximate the upper limit; while when using the third separator (Fig. 13) as the initial separation stage, the density should approximate the lower limit. In "heavy media" type separations, the density should be maintained to approximate the upper limit so as to provide as large a recovery of valuable mineral per hour as is possible. In any case, the desired density can be regulated and maintained by controlling the feed rate to be within the limits noted above by pumping the aqueous carrier at a rate of approximately 5000 gallons per hour, plus or minus 1000 gallons.

In some cases the distributors, batteries and splitters may be conveniently constructed to be sectionalized or split (as into equal halves) so as to admit of easy handling in mounting and dismounting different sized structures about the feed pipe as a center and onto the stationary support tower. This is easily accomplished in view of the fact that all parts may be fabricated from sheet metal. Any suitable disconnectable means may be used to hold the parts together in assembled relationship.

In separating readily flowable solids, such as seeds and grains, with the pinched-sluice construction of the instant invention it will be necessary to change the dimensions such that the slope $\theta$ will be greater than the permissible maximum for "gravity type" separations by between 15 and 25 degrees, the range of travel length will be slightly decreased to between 24 and 42 inches, the maximum allowable feed rate increased to approximately 2.5 tons per hour, per segment, and the nose width increased slightly, dependent upon the specific type subject matter separated.

From the above disclosures, it will be appreciated that the instant invention provides a host of hitherto unobtainable features and results, some of which have long been considered impossible of attainment.

As many apparently widely different embodiments of this invention may be made without departing from the spirit and scope hereof, it is to be understood that the above invention is not limited except as defined in the appended claims.

This application is a continuation-in-part of our prior application Serial No. 103,048, filed July 4, 1949 and now Patent No. 2,644,583.

What is claimed is:

1. A process for concentrating valuable mineral-bearing ores which comprises the steps of reagentizing said ore, feeding said reagentized ore into an aqueous solution at the rate of .5 ton per hour or less, to thereby form an aqueous slurry having a maximum density of 35 percent solids, causing said slurry to flow as a shallow stream a distance between 24 and 36 inches, while simultaneously converging said slurry at an included angle between 6° and 16° into a narrow lamellar stream having a width between ½ and 1 inch, mildly sloping said stream to cause said stream to flow as a tranquil lamellar stream without sandbarring, then causing said slurry to fall freely in a gravity field to form a vertical lamellar stream and separating said stream into separate mineral-bearing strata in said zone of free fall.

2. A process for separating valuable minerals from a valuable mineral-bearing ore which comprises the steps of dispersing said ore in an aqueous solution to form an aqueous slurry having a density (percent solids) of between 55 and 72 percent, flowing said slurry over an inclined surface while gradually converging the width of said flow at an angle of between 6 and 16° over a length of travel between 36 and 42 inches, mildly sloping said surface to cause said slurry to flow as a tranquil lamellar stream without sandbarring, said flowing and converging action stratifying said slurry into separate strata of valuable and waste materials, then causing said stratified slurry to fall freely in a gravity field to produce a vertical lamellar stream of separate strata, and then separating the strata so formed into at least two distinct fractions in said zone of free fall at a distance of at least 1/16 inch from the discharge end of said converged slurry flow.

3. The process claimed in claim 2 wherein the strata are separated into three distinct fractions constituting a tailing, a middling and a concentrate portion, respectively.

4. A process as claimed in claim 3 in which said tailing portion is reprocessed in like manner.

5. A process as claimed in claim 3 in which said concentrate portion is reprocessed in like manner.

6. A process as claimed in claim 3 in which said middling portion is reprocessed in like manner.

7. An apparatus for separating a granular slurry into its constituent components comprising a trough having raised side walls which converge from its feed end to its outlet end at an angle of between 6 and 16 degrees to an outlet width of between ⅜ inch and one inch, atmospheric-pressure feed means operatively associated with said feed end for providing a tranquil flow of slurry to said trough, said trough having a flat bottom with an inclination to the horizontal of between 9 and 23 degrees for cooperating with said raised converging side walls to guide said slurry to flow in a downwardly sloping stream of increasing depth under tranquil laminar conditions of flow without sand-barring while substantially increasing its velocity to segregate said constituents into strata within said stream, and sharp-edged flow dividing means disposed a short distance from and across the width of said outlet end of said trough and within said stream which discharges freely from said outlet end to divide said stream into separate streams in accordance with said strata.

8. The combination set forth in claim 7 in which a plurality of said inclined troughs are arranged in a circular formation side by side to form an inverted cone configuration having like adjacent central discharge peripheries and in which said dividing means consist of an integral inverted hollow truncated cone having its largest peripheral circumference positioned at least ⅟₁₆ inch from all said discharge ends.

9. A separating and concentrating unit for the separation of different type granules from a granular mixture, including a plurality of triangularly-shaped pinched-sluice separating units, each said pinched-sluice including a triangularly shaped floor and integral vertically extending side walls which converge along respective sides of said floor from the base of the triangle towards its apex at an included angle of between 6° and 16°, said side walls terminating when spaced apart a distance equal to between ⅜" and 1", said plurality of pinched-sluice units being oriented into a spoke-like formation having the bases of the triangularly shaped floors positioned to substantially contact one another to thereby form a circular configuration, each of said sluices being inclined from the horizon towards the center of said circular configuration at an angle of between 9° and 23°, the general contour of said plurality of pinched-sluice units being in the shape of an inverted frustrum of a cone.

10. The combination set forth in claim 9 in which the inclined triangular apex portions of said plurality of sluices terminate adjacent one another to form a central circular opening at the apex of the inverted frustrum, a tubular funnel inserted in said opening and including an integral angularly extending circular flange thereabout, the extended edge portion of said flange terminating at a radical distance of approximately ⅟₁₆" at least from the adjacent edges of said plurality of pinched-sluice units.

11. In a separating unit for separating valuable minerals from mineral-bearing ores including gangue materials, the combination of a vertically extending conduit, a plurality of separating batteries vertically spaced one above the other and surrounding said conduit, each separating battery including a plurality of pinched-sluice type troughs arranged in an annular array about said tubular conduits and each having a floor surface of triangular shape with the apex portion of the triangularly shaped floor surfaces vertically depending below the horizon at an angle of between 9° and 23°, to thereby form a conical separating battery having the shape of an inverted frustrum of a cone, supporting means for supporting each said battery vertically spaced from the others, distributing means connected to said tubular conduit and positioned to cooperate with the uppermost separating battery, a plurality of fluid-splitting members surrounding said tubular conduit, each member including a tubular depending sleeve portion and an integral angularly extending peripheral splitter lip, a plurality of frustro-conical distributors surrounding said tubular conduit but vertically spaced apart thereon, each distributor being positioned to cooperate with selected separating batteries and control means for adjusting said splitter members vertically.

12. The combination set forth in claim 11 in which said supporting means include a plurality of groups of annular rod-shaped elements, said first group including one each of said elements positioned adjacent the base periphery of the inverted conical batteries, a second group of said elements being respectively positioned adjacent the apex of the said batteries, a third group of said elements being positioned vertically below each element of said first group but spaced therefrom, and connecting means for structurally interconnecting said spaced elements to form a single integral support structure.

13. The combination set forth in claim 11 in which said supporting means includes a plurality of annular members arranged in groups of two each, one each of said groups being positioned vertically above and adjacent the apex of each conical battery, one annular member of each group being vertically positioned below each said conical battery but frictionally abutting the lower surface thereof, and a clamping structure cooperating with each group of said annular elements to rigidly clamp the constituent elements thereof together.

14. The combination set forth in claim 13 in which slots are formed in the individual pinched-sluice units of each separating battery and the upper annular member of each group is positioned in said slots.

15. A separating unit for separating different component parts of a granular mixture from a slurry thereof comprising, a separating battery including a plurality of pinched-sluice type troughs, each trough including a triangularly shaped floor surface and integral converging vertically extending spaced side walls, said plurality of troughs being spacially positioned adjacent each other in spoke-like array to form a separating unit of plural troughs having the general configuration of an inverted frustrum of a cone, a distributing cone positioned above said separating unit and having the base of the cone positioned adjacent the base of said inverted conical frustrum, distributing means for supplying said slurry adjacent the apex of said distributing cone, and a slurry-separating structure positioned adjacent the apex of said inverted conical frustrum and adapted to separate a slurry of mineral-bearing ore conveyed thereover into at least two distinct strata, and conduit means for directing the said separated stratum to a position remote from said separating unit.

16. The combination set forth in claim 15 in which a second identical distributing cone is positioned below said slurry separating structure and a second identical separating battery is positioned below said second distributing cone, said conduit means including structure for conveying one said slurry stratum onto the apex portion of the second distributing cone, and a second slurry separating structure positioned adjacent the apex of said second separating unit.

17. A separating unit for separating valuable minerals from a slurry of mineral-bearing ores comprising a horizontally positioned separating battery having the configuration of an inverted frustrum of a cone, said battery including a plurality of pairs of vertically extending side walls which converge from the base towards the apex of said cone frustrum, a central feed pipe extending vertically through the frustrum apex of said battery, and a cylindrical element concentrically positioned about said pipe and including an integral angularly extending circular flange which terminates a distance equal to at least ⅟₁₆ inch from the perimeter of said battery frustrum apex.

18. An apparatus for separating valuable minerals from an aqueous mineral-bearing slurry including a plurality of individual slurry bearing sluices grouped about a central vertical axis, means for feeding said aqueous slurry into said individual sluices, and a slurry separating element including an angularly upstanding circular flange centered about said central vertical axis and having its periphery terminating adjacent the edges of said plurality of sluices.

19. A process for concentrating and separating the valuable minerals from a mineral-bearing aqueous slurry comprising, flowing said slurry over a smooth and flat surface of a uniform declination from the horizontal between 9° and 23°, while simultaneously converging said slurry at an included angle of between 6° and 16° into a stream of increasing depth to provide tranquil lamellar flow without sandbarring, discharging said converged slurry into a field of gravity whereby to form a slurry lamellar stream, and mechanically separating said lamellar stream into distinct portions while freely falling in said field of gravity.

20. A process for separating like component granules from a granular mixture comprising, causing said mixture to flow over a smooth inclined surface as a wide shallow stream while simultaneously converging it in a gradual and systematic manner into a narrow deep stream, said inclination and said convergence cooperating to provide tranquil lamellar flow without sandbarring, separating said stream in a field of gravity into at least two distinct portions, causing one said portion to be again processed while flowing over a smooth inclined surface as a wide shallow stream while gradually and systematically converging it into a deep narrow stream, separating said latter stream flow into at least two further portions, and combining one of said last portions with the other one of said first distinct portions, and reprocessing said combined portions in like manner.

21. An apparatus for concentrating and separating valuable minerals from a mineral-bearing slurry comprising, a plurality of pinched-sluices grouped together about a central axis and radiating therefrom, each sluice consisting of an elongated trough having a triangular floor of smooth surface and vertical side walls which converge towards the said central axis, said troughs terminating at a radial distance from said central axis to form a central circular opening.

22. A process for concentrating and separating a valuable mineral for a mineral-bearing ore, comprising, comminuting said ore to be a size between 8 and 200 mesh, feeding said ore into an aqueous stream at the rate of between 0.2 and 1.5 tons per hour to thereby form a mineral-bearing slurry, controlling said stream flow whereby the density of said slurry is maintained between 25% and 72% dry solids, causing said slurry to flow as a wide shallow stream over a flat surface of uniform declination to the horizontal, converging said shallow slurry stream into a narrow deep stream in a gradual and systematic manner to provide tranquil lamellar flow within said stream without sandbarring, separating said deep stream into a lamellar stream in a zone of free fall, and splitting said lamellar stream into several distinct portions in said zone of free fall.

23. A process according to claim 20 including the further steps of further separating said reprocessed combined portions into a tailings and concentrate, respectively, and recycling said latter tailings portion into intimate contact with said one of said first distinct portions for further reprocessing therewith.

24. A process according to claim 20 in which each of said separations divides the stream flow into three distinct portions constituting a tailings, a middlings and a concentrate and in which said recombined portions are the middlings from said initial separated stream and the tailings from said second separated stream.

25. A process according to claim 20 in which said mixture is suspended in an aqueous carrier.

26. A process according to claim 25 in which said mixture is an ore and includes a mixture of finely-ground high-density material.

27. A method of separating a granular mixture into its constituent components which comprises the steps of dispersing said mixture in a liquid slurry, guiding said slurry to flow in a downwardly sloping and converging stream of increasing depth under tranquil lamellar conditions of open channel type flow without sandbarring while substantially increasing its velocity to segregate said constituents into strata within said stream, said downward slope of said stream being sufficient to cause all surfaces of said stream to slope downward, discharging said stratified slurry in a freely falling stream, and dividing said freely falling stream into separated streams in accordance with said stratification.

References Cited in the file of this patent

UNITED STATES PATENTS

| | | |
|---|---|---|
| 289,261 | Hershey | Nov. 27, 1883 |
| 800,293 | Hague | Sept. 26, 1905 |
| 1,197,888 | Adams | Sept. 12, 1916 |
| 1,294,603 | Becott | Feb. 18, 1919 |
| 1,811,408 | Stebbins | June 23, 1931 |
| 2,100,262 | Moorhead | Nov. 23, 1937 |
| 2,171,674 | Schifferle | Sept. 5, 1939 |
| 2,362,130 | Glenn | Nov. 7, 1944 |
| 2,579,110 | Drelon | Dec. 18, 1951 |

FOREIGN PATENTS

| | | |
|---|---|---|
| 165,208 | Great Britain | June 23, 1921 |
| 610,516 | Great Britain | Oct. 18, 1948 |